(12) United States Patent
Ustuner et al.

(10) Patent No.: US 6,309,356 B1
(45) Date of Patent: Oct. 30, 2001

(54) METHOD AND APPARATUS FOR FORMING MEDICAL ULTRASOUND IMAGES

(75) Inventors: Kutay F. Ustuner, Mountain View; Charles E. Bradley, Burlingame; Lewis J. Thomas, Palo Alto; Ching-Hua Chou, Fremont; David Napolitano, Pleasanton, all of CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/518,972

(22) Filed: Mar. 6, 2000

(51) Int. Cl.[7] .................................................. A61B 8/00
(52) U.S. Cl. ............................................................ 600/443
(58) Field of Search ...................................... 600/437, 407, 600/443, 447, 453–458; 73/625, 626; 367/7, 11, 130, 138

(56) References Cited

U.S. PATENT DOCUMENTS

| | | |
|---|---|---|
| 4,550,607 | 11/1985 | Maslak et al. . |
| 5,573,001 | 11/1996 | Petrofsky et al. . |
| 5,685,308 | 11/1997 | Wright et al. . |
| 5,924,986 | 7/1999 | Chandler et al. . |
| 6,221,018 * | 4/2001 | Ramamurthy et al. .............. 600/443 |

OTHER PUBLICATIONS

"Realization of Sinc Waves in Ultrasound Imaging Systems", Mok–Kun Jeong, Sung–Jae Kwon, Tae–Kyong Song and Moo–Ho Bae, Ultrasonic Imaging 21, 173–185 (1999).

"Experimental Study of High Frame Rate Imaging with Limited Diffraction Beams", Jian–yu Lu, IEEE Transactions of Ultrasonics, Ferroelectrics, and Frequency Control, vol. 45, No. 1, Jan. 1998.

"Real–Time 3–D Ultrasound Imaging Using Sparse Snythetic Apertue Beamforming", Geoffrey R. Lockwood, James R. Talman and Shelby S. Brunke, IEEE Transactions on Ultrasonics, Ferroelectrics, and Frequency Control, vol. 45, No. 4, Jul. 1998.

"Generation of Sinc Wave by a One–Dimensional Array for Applications in Ultrasonic Imaging", Mok Keun Jeong, Tae Kyong Song, Song Bai Park and Jong Beom Ra, IEEE Transactions on Ultrasonics, Ferroelectrics, and Frequency Control, vol. 43, No. 2, Mar. 1996.

\* cited by examiner

Primary Examiner—Marvin M. Lateef
Assistant Examiner—Ali M. Imam
(74) Attorney, Agent, or Firm—Brinks Hofer Gilson & Lione

(57) ABSTRACT

A pulse echo beamforming system generates high spatial bandwidth ultrasound images using only a few transmit/receive events per frame. Each transmit/receive event consists of firing an unfocused or weakly focused wave and receiving and storing the echo on every receive channel. Each set of stored echoes is delayed and apodized to form component beams for each desired image point in the region insonified by that particular wave. The final images are synthesized by adding two or more of the component beams for each image point.

40 Claims, 17 Drawing Sheets

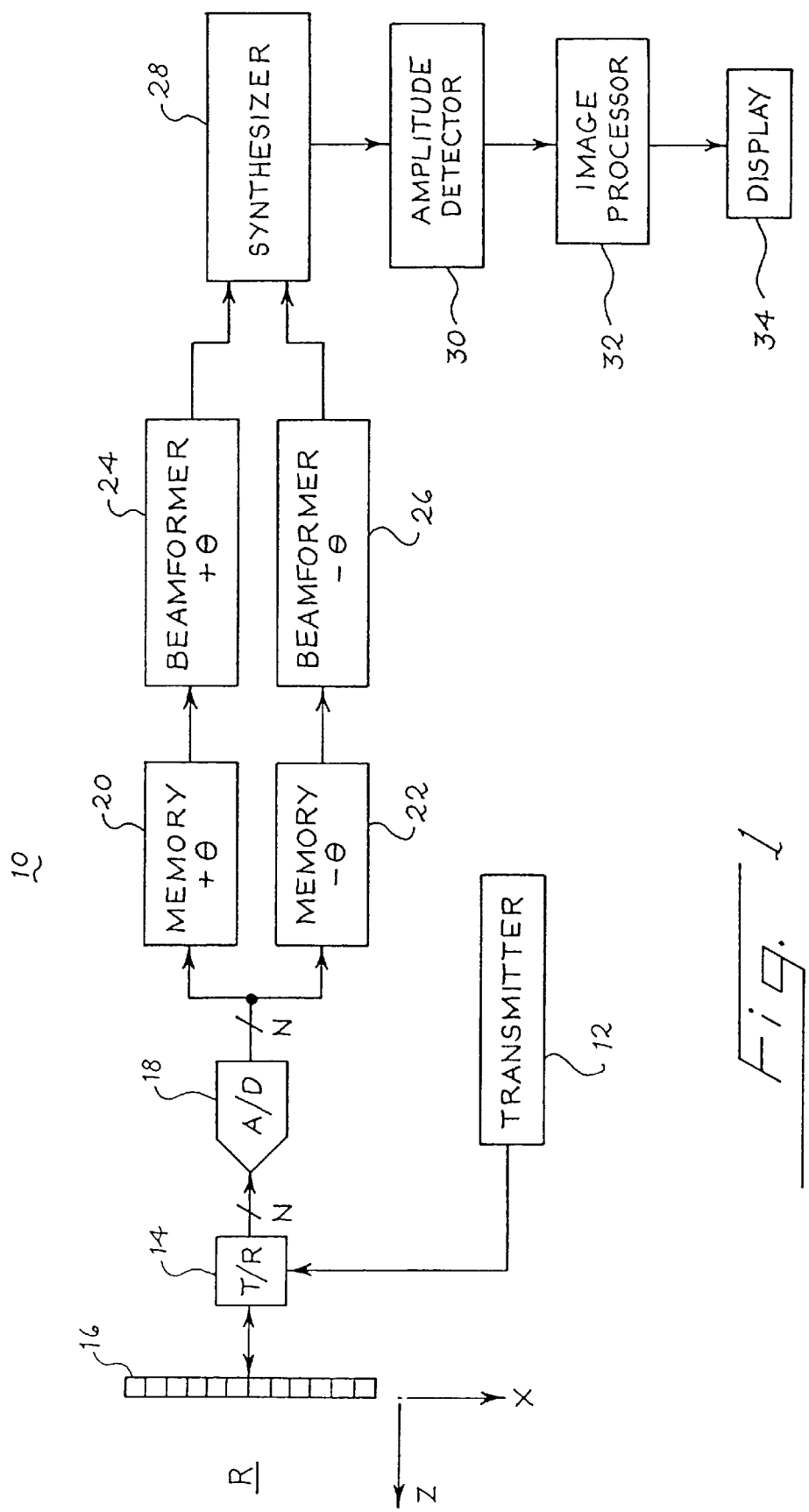

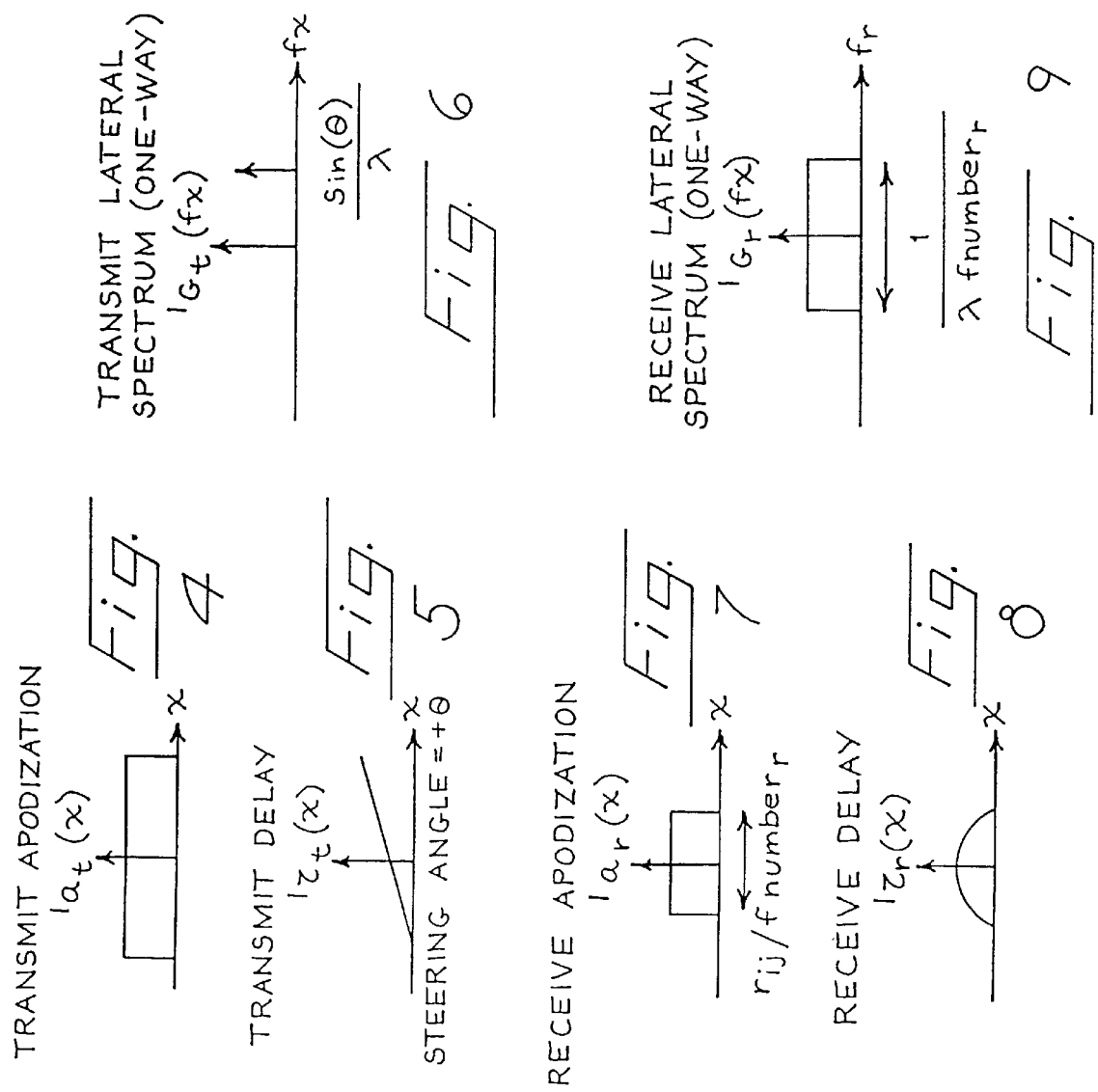

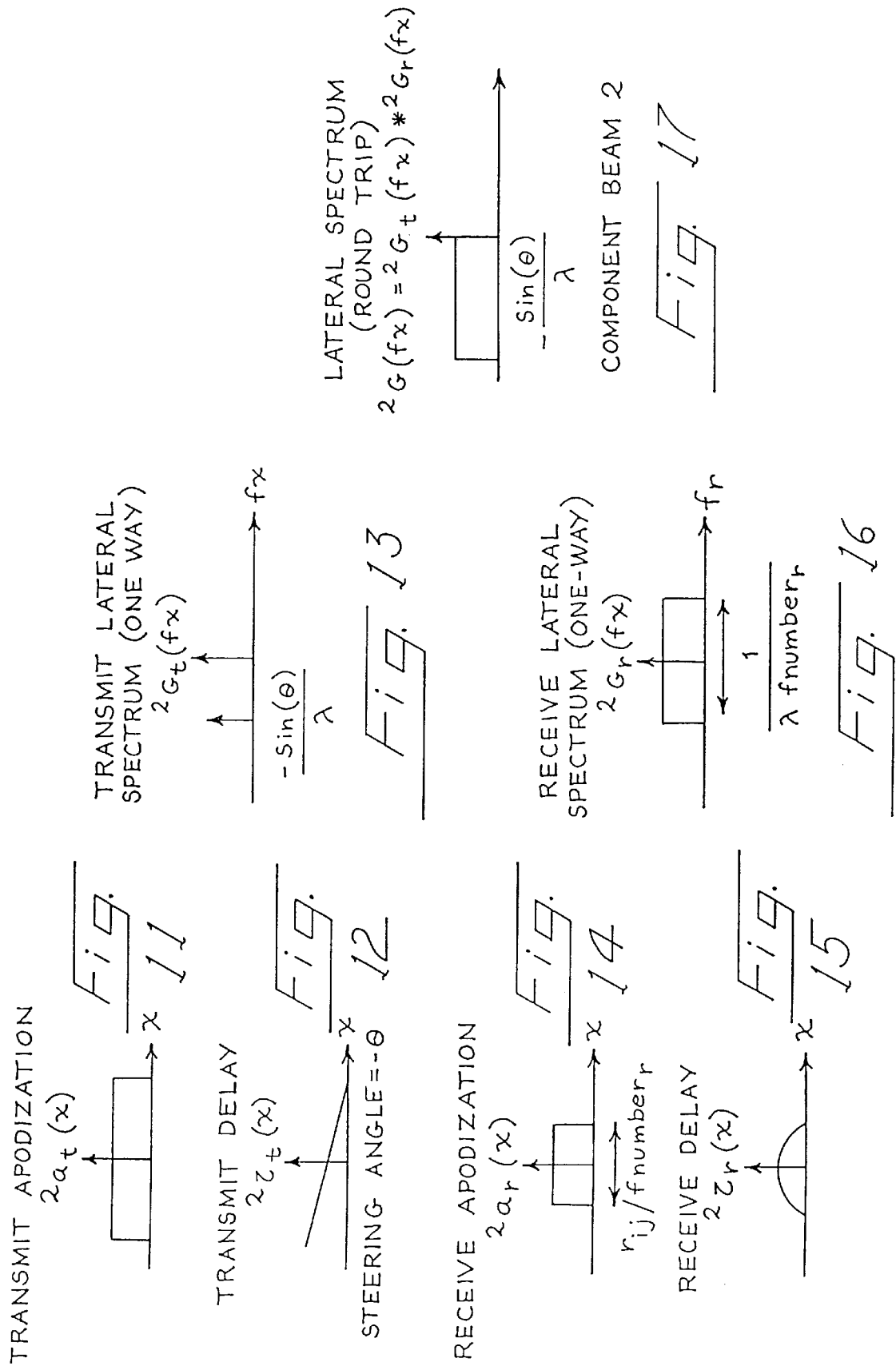

LATERAL SPECTRUM
(SYNTHESIZED)

$$G(fx) = {}^1G(fx) + {}^2G(fx)$$

$$\frac{2}{\lambda\, fnumber_r}$$

SYNTHESIZED BEAM

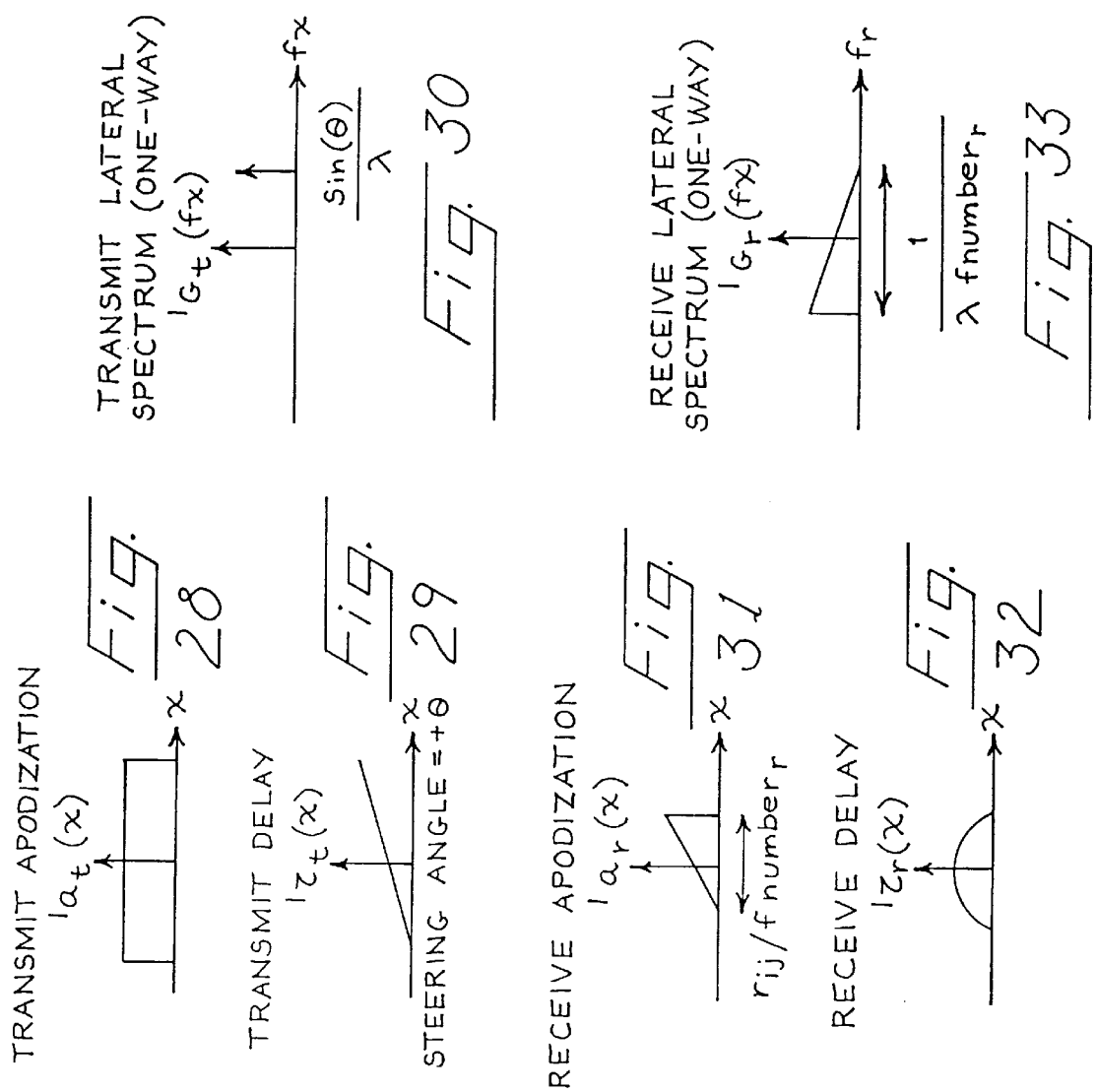

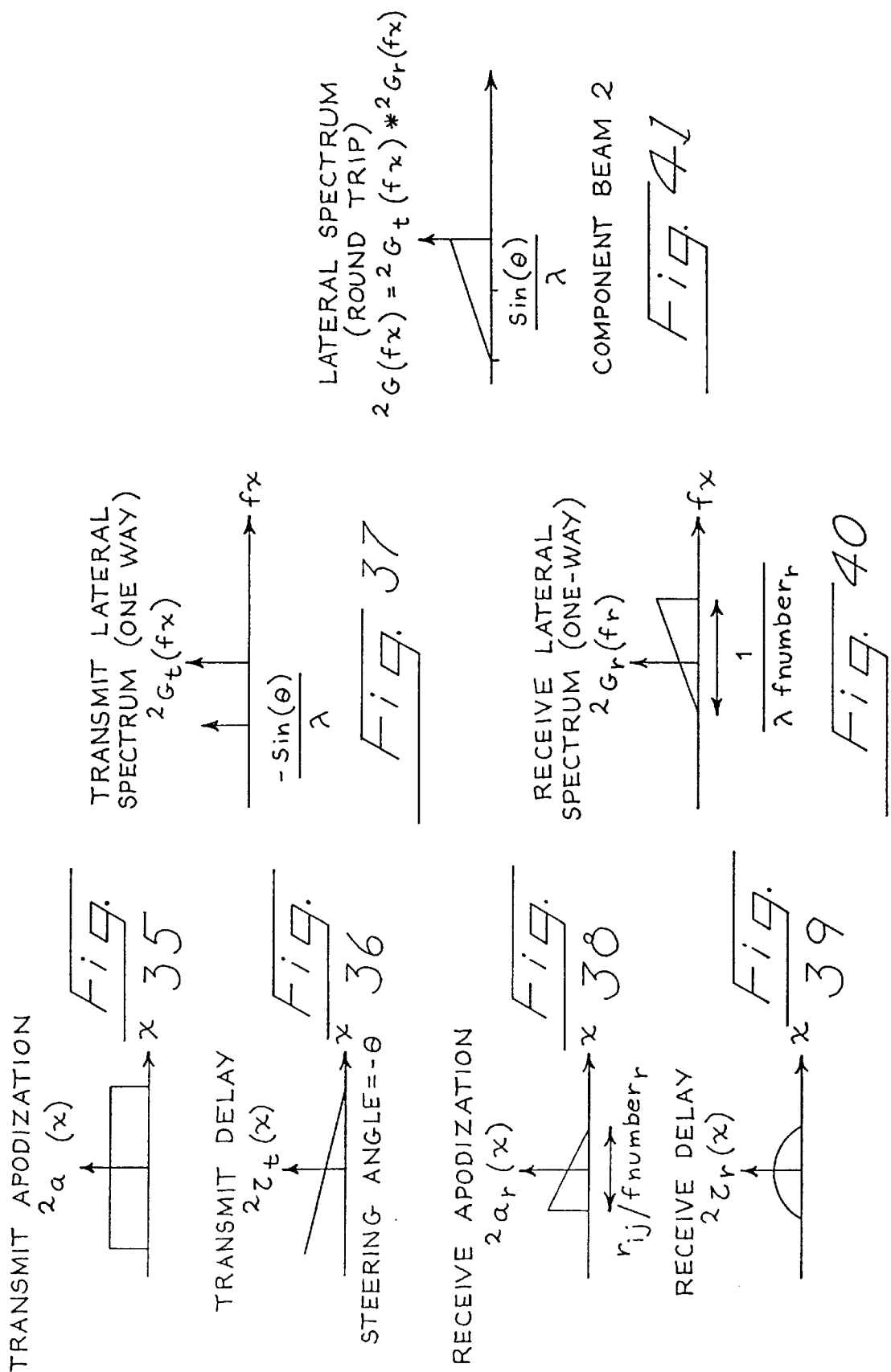

LATERAL SPECTRUM
(SYNTHESIZED)

$$G(fx) = {}^1G(fx) + {}^2G(fx)$$

$$\frac{2}{\lambda \, fnumber_r}$$

SYNTHESIZED BEAM

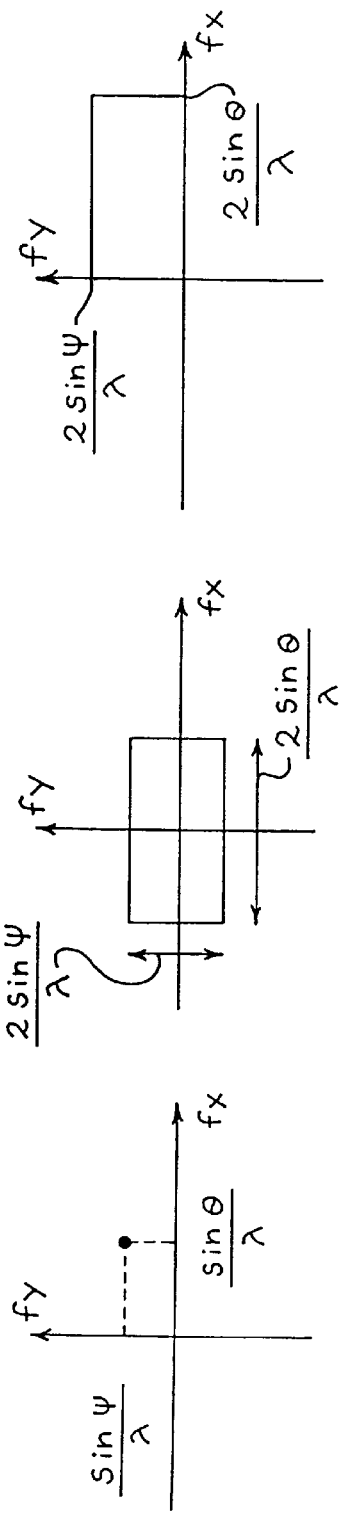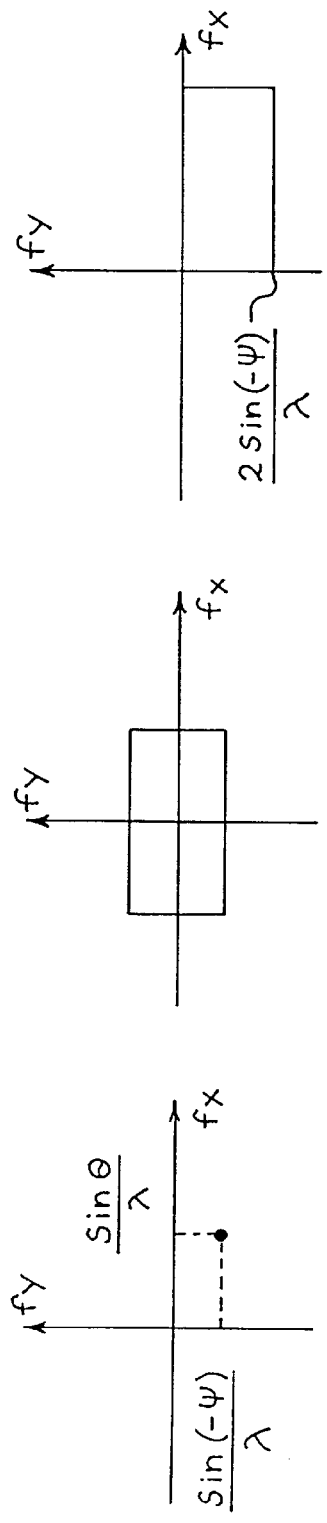

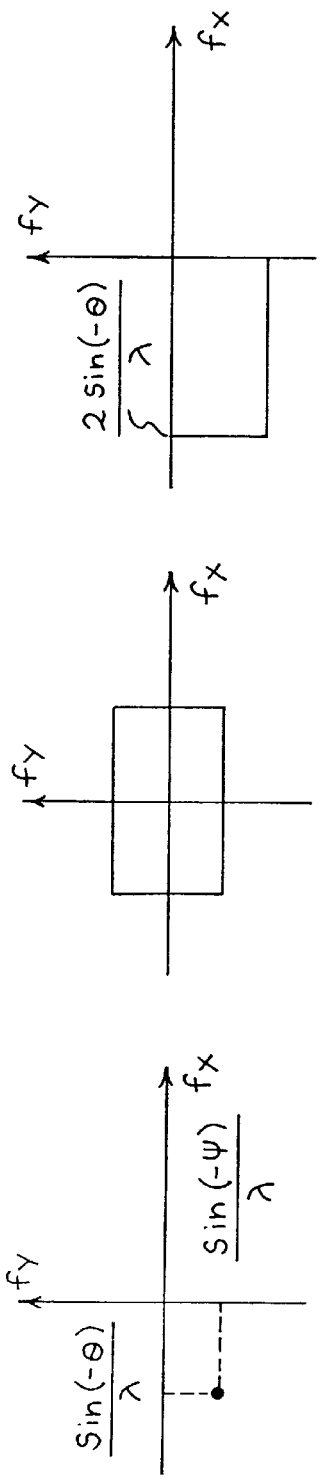
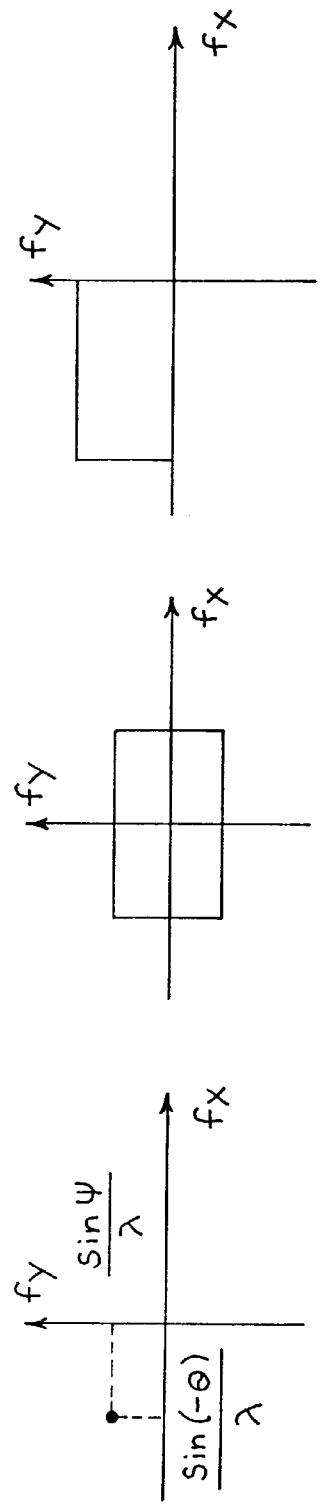

METHOD AND APPARATUS FOR FORMING MEDICAL ULTRASOUND IMAGES

BACKGROUND

This invention relates to medical ultrasonic imaging, and in particular to a new beamforming method and apparatus that require only a few transmit/receive events to form an entire frame of an image.

Commercially available medical ultrasonic imaging systems use a large number of transmit/receive events for each frame of the image. Each transmit event steers a pulsed beam of ultrasonic energy along a particular scan line and focuses this energy to a particular focus depth. After each transmit event, echoes are received, amplified and digitized. The receive beamformer generates a line of the image by dynamically focusing and apodizing the receive signals along a scan line. To increase transmit depth of field, some systems use multiple transmit/receive events per scan line, each transmit event focused at a different depth. To increase frame rate, some systems use multiple beamformers that can generate multiple lines of an image per transmit/receive event. With all these conventional approaches, each frame of the image is constructed from a large number of scan lines (typically 50 to 250, depending on the lateral resolution and total scan extent) and therefore from a large number of transmit/receive events. The frame rate is ultimately limited by the total number of transmit/receive events, because each transmit/receive event takes a finite amount of time determined by the speed of sound, maximum depth of interest and system overhead. This limitation is particularly acute for three-dimensional imaging. Examples of commercially successful ultrasonic imaging systems of this type are described in the following U.S. patents, all assigned to the assignee of the present invention: U.S. Pat. Nos. 4,550,607; 4,699,009; 5,148,810; 5,235,986; 5,573,001; 5,608,690; 5,623,928; 5,675,554; 5,685,308.

Various unconventional techniques have been proposed to increase transmit depth of field without having to use multiple transmit/receive events per scan line. In one of these proposals, simultaneously fired multiple plane waves with different steering angles were used to form limited diffraction transmit beams called Sinc Waves [1]. Sinc Waves were demonstrated to maintain the lateral field response over a greater depth of field than even a Gaussian apodized transmitter. However, this method required element to element variation of the transmit pulse waveform.

Later, another method was reported which eliminated this disadvantage and combined the synthesized transmit Sinc Wave with receive dynamic focusing [2]. In this method plane waves with different steering angles were fired sequentially and the image was synthesized using all transmit/receive events. This method, on the other hand, has the disadvantage of a slow data acquisition rate due to many transmit/receive events (in the example given 41 successively fired plane waves were used). If the object moves and/or the user scans the object during these transmit/receive events, serious motion artifacts result. It was also reported that if the number of transmit/receive events, i.e., the number of plane waves, were reduced, then the side lobes were adversely affected.

Other methods have also been devised to form limited diffraction beams. One of the limited diffraction beam types, called X Waves, was used to develop a very high frame rate image construction technique called the Fourier method [3]. In this technique the array transducer is excited to produce a plane wave. From the received and recorded echo, the limited diffraction response is produced by a bank of stepwise sine and cosine apodizations. The multi-dimensional spectrum of the object is derived from the temporal Fourier transform of the apodized signal. The image is then constructed through the Inverse Fourier Transform of the spectrum. Since a single transmit/receive event is used and the Fourier and inverse Fourier transforms can be computed at high speed with FFT processors, this technique was reported to have the potential to achieve very high frame rates with simple hardware. The images formed with this technique were reported to be detail and contrast resolution equivalent to images generated by a conventional dynamic receive beamformer operating with a pulsed plane wave excitation on transmit. This technique therefore provides only half the maximum achievable lateral spatial bandwidth.

Another technique that was proposed to form real-time 3-D ultrasound images used Sparse Synthetic Aperture Beamforming [4]. Each frame of image is synthesized from a few sets of echoes, where each set of echoes is in response to a spherical wave insonification of the object. This method suffers from low SNR because only a few elements are used for each transmit firing and the amplitude of diverging spherical waves is inversely proportional to the propagation distance. To make up for the SNR deficit, it was proposed to increase the number of elements per transmit firing and to use many firings per frame.

REFERENCES

[1] Jeong, M. K. et al., "Generation of Sinc Wave by a One-Dimensional Array for Application in Ultrasonic Imaging", IEEE Transactions on Ultrasonics, Ferroelectrics, and Frequency Control, Vol. 43, No. 2, 285–295, Mar. 1996.

[2] Jeong, M. K. et al., "Realization of Sinc Waves in Ultrasound Imaging Systems" Ultrasonic Imaging, 21, 173–185, 1999.

[3] Lu, J., "Experimental Study of High Frame Rate Imaging with Limited Diffraction Beams", IEEE Transactions on Ultrasonics, Ferroelectrics, and Frequency Control, Vol. 45, No.1, 84–97, January 1998.

[4] Lockwood, G. R., et al., "Real-Time 3-D Ultrasound Imaging Using Sparse Synthetic Aperture Beamforming", IEEE Transactions on Ultrasonics, Ferroelectrics, and Frequency Control, Vol. 45, No.4, 980–988, July 1998.

SUMMARY

The following describes a high frame rate, high spatial bandwidth ultrasonic imaging system that uses multiple unfocused or weakly focused waves that are sequentially transmitted at different directions. The echoes received in response to each insonification are digitized and stored for every channel. The sets of stored receive signals are each delayed and apodized to form component beams for each desired image point in the region insonified by the respective waves. The final images are synthesized by adding two or more of the component beams for each image point.

As an alternative to sequential transmission, the waves are temporally modulated with orthogonal codes and fired simultaneously. In this case, the received echo signals are decoded before the synthesis, either before or after beamformation.

The preferred type of waves for planar arrays are plane waves steered relative to each other. Unfocused diverging waves can be used to support constant acceptance angle aperture growth rate on curved arrays or to cover a wider field of view. Alternately, weakly focused waves can be used to improve SNR at the expense of field of view.

The systems described below provide an unusually high frame rate and unusually high spatial bandwidth. Only two transmit/receive events are required to form a full bandwidth image over the entire region over which the areas of insonification of the corresponding waves overlap.

The systems described below are spatial impulse response equivalent to theoretical dynamic transmit/dynamic receive beamformers. In other words, every image point is effectively at focus for both transmit and receive. These systems also offer full control over the beam-width/side-lobe compromise through two programmable parameters: transmit wavefront angle and receive apodization.

The foregoing remarks have been provided only by way of introduction, and they are not intended to limit the scope of the following claims.

BRIEF DESCRIPTION OF THE DRAWINGS

FIG. 1 is a block diagram of a medical ultrasonic imaging system that incorporates a preferred embodiment of this invention.

FIG. (3) is a block diagram of a method performed by the system of FIG. 1.

Figure 3:
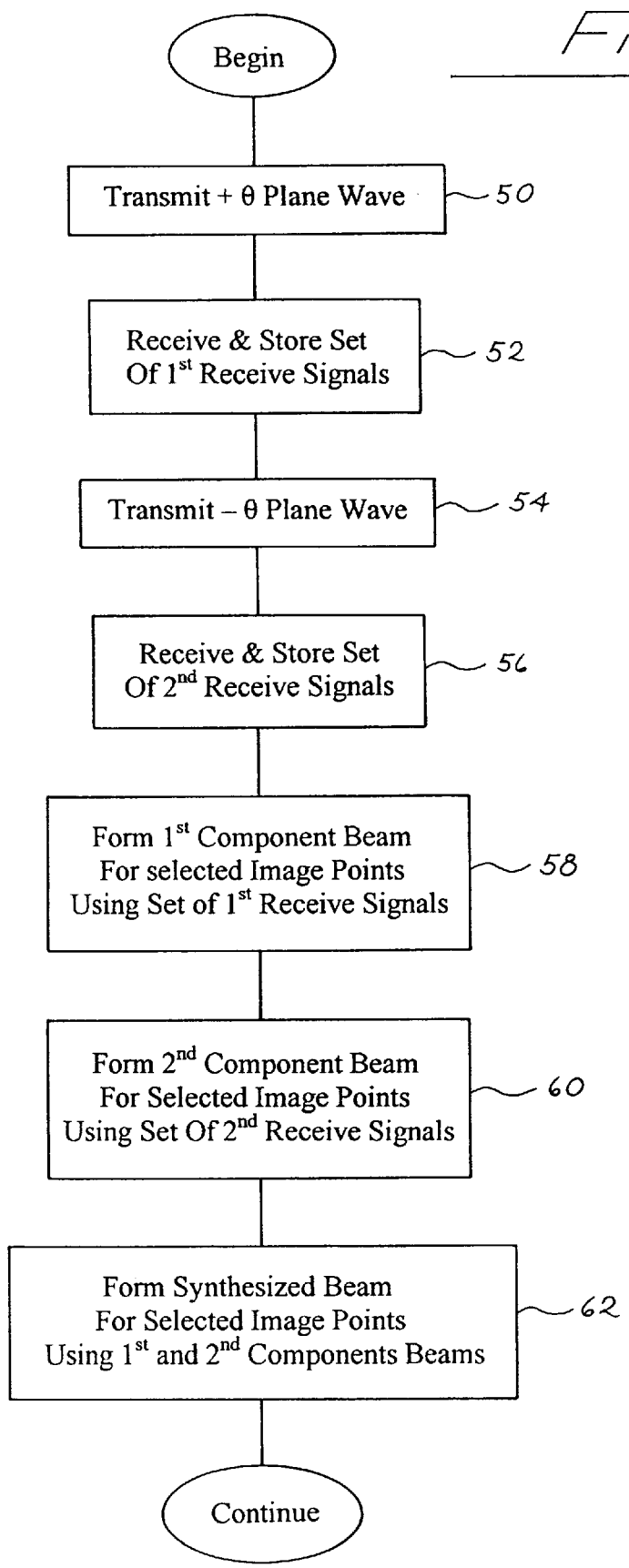

FIGS. 4–18 are graphs illustrating respective steps of the method of FIG. 3 for a synthesized RECT-shape round-trip aperture function.

Figure 19:
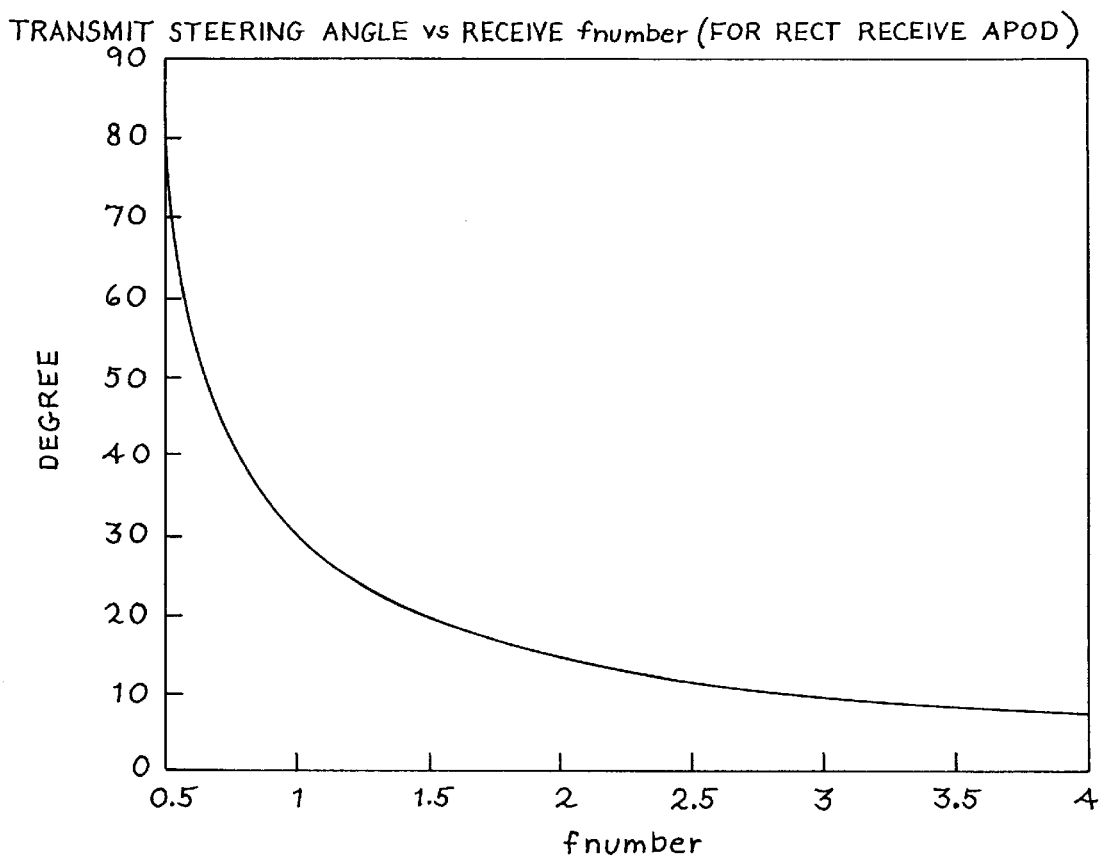

FIG. 19 is a graph showing a preferred transmit steering angle as a function of receive f-number (effective receive apodization shape of RECT is assumed).

Figure 20:
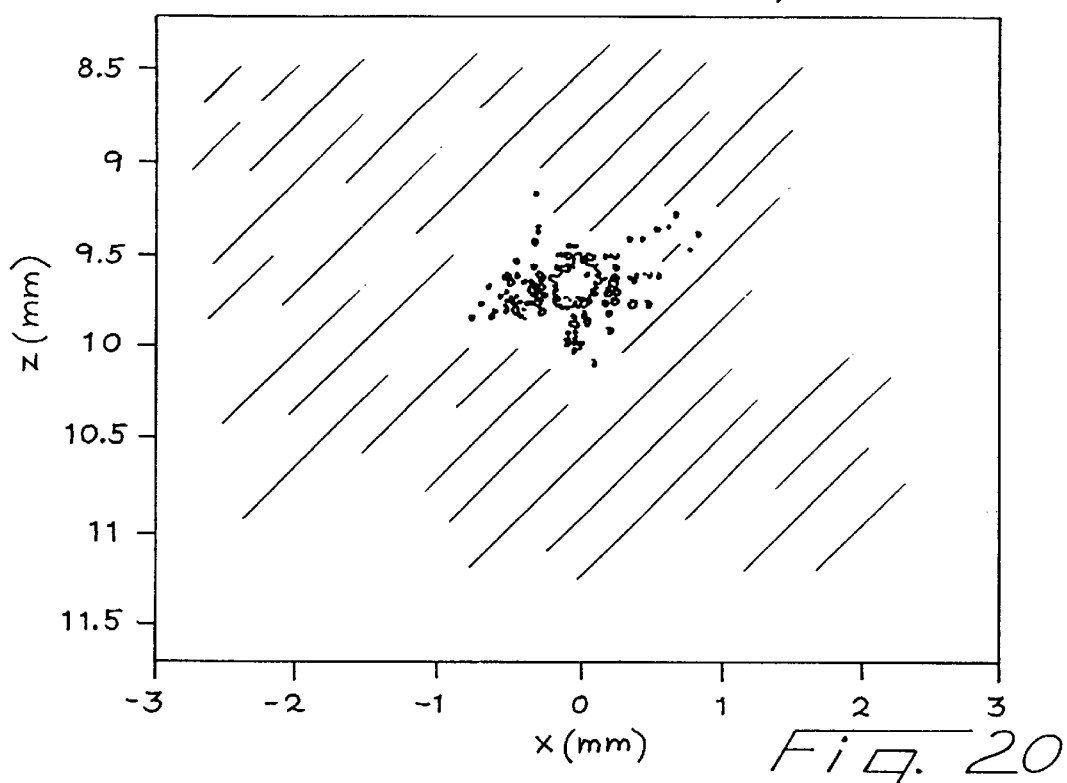
Figure 21:
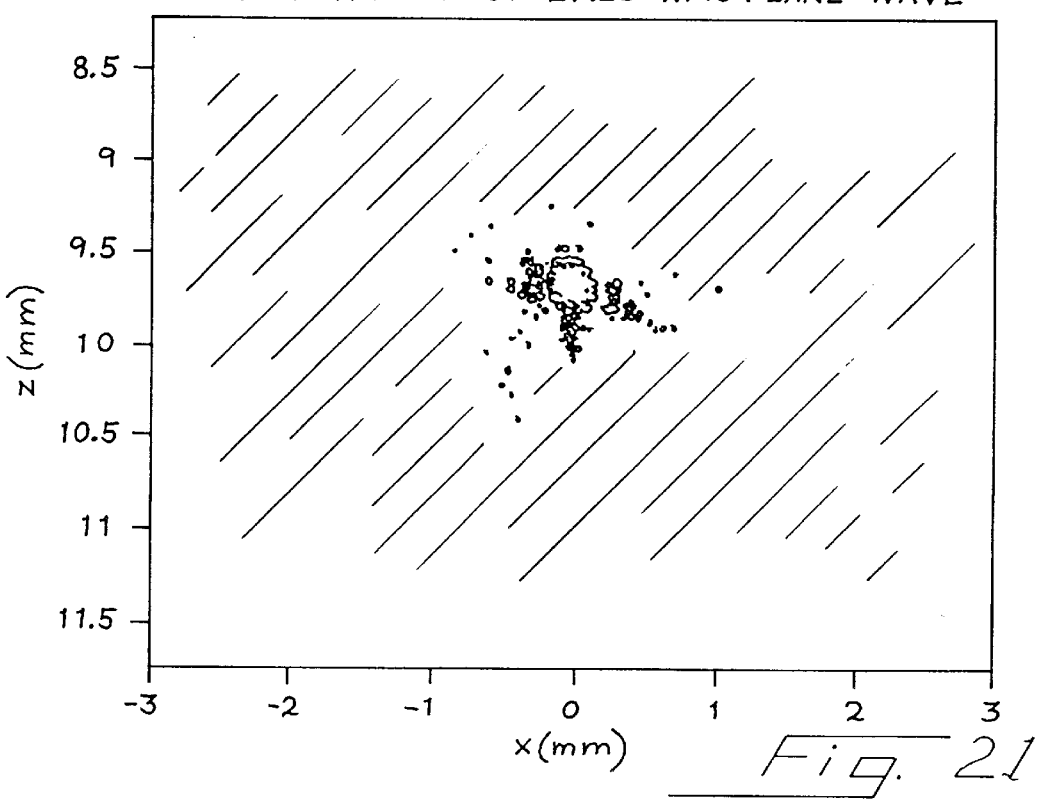

FIGS. 20 and 21 show simulated point spread functions of the component beams for a right steered transmit plane wave and a left steered transmit plane wave, respectively.

Figure 22:
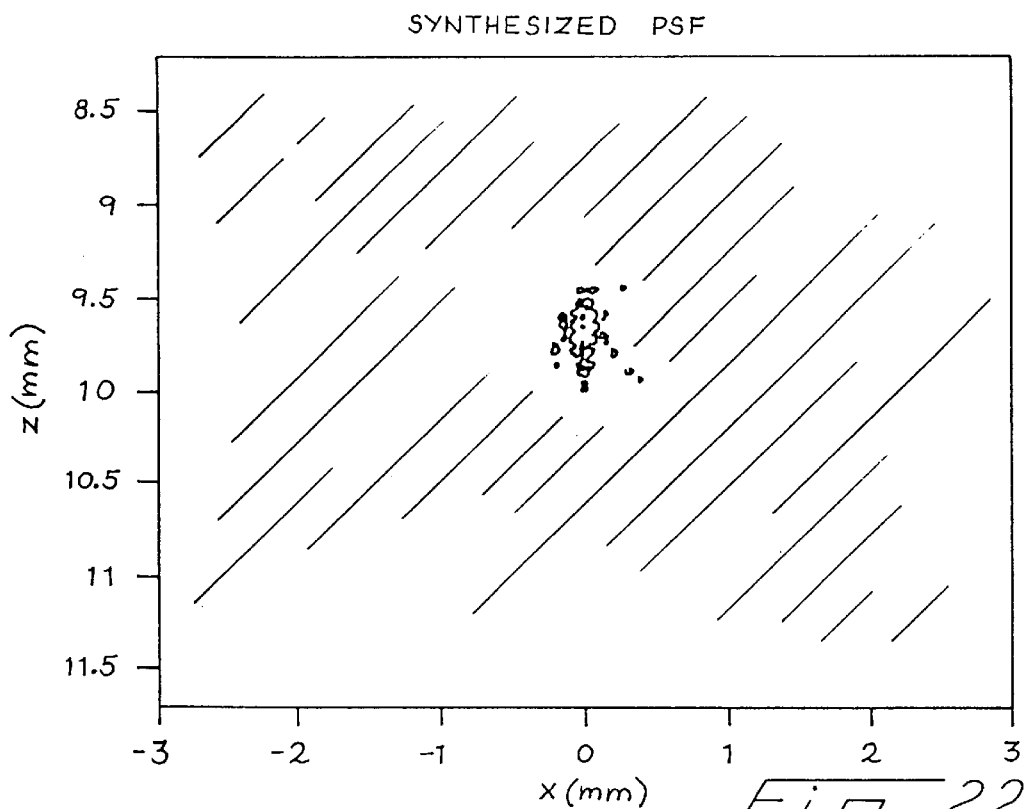

FIG. 22 shows the point spread function of the beam synthesized by using the component beams shown in FIGS. 20 and 21.

Figure 23:
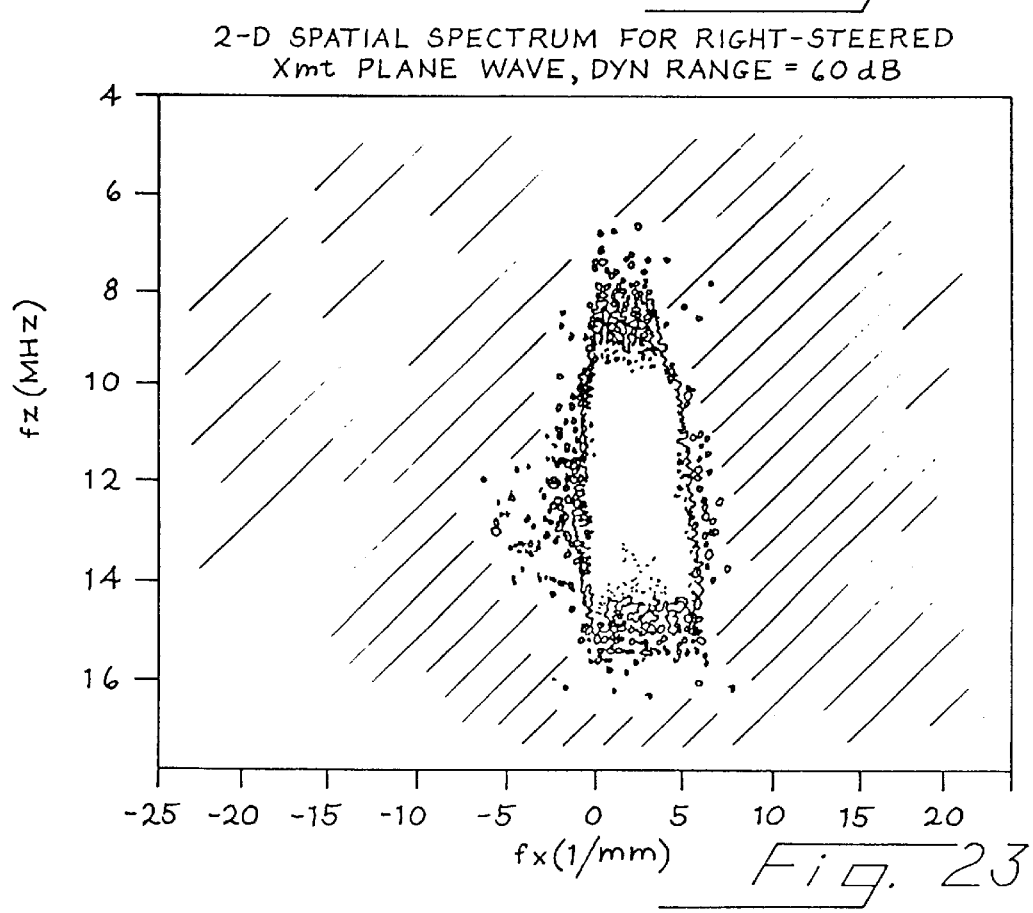
Figure 24:
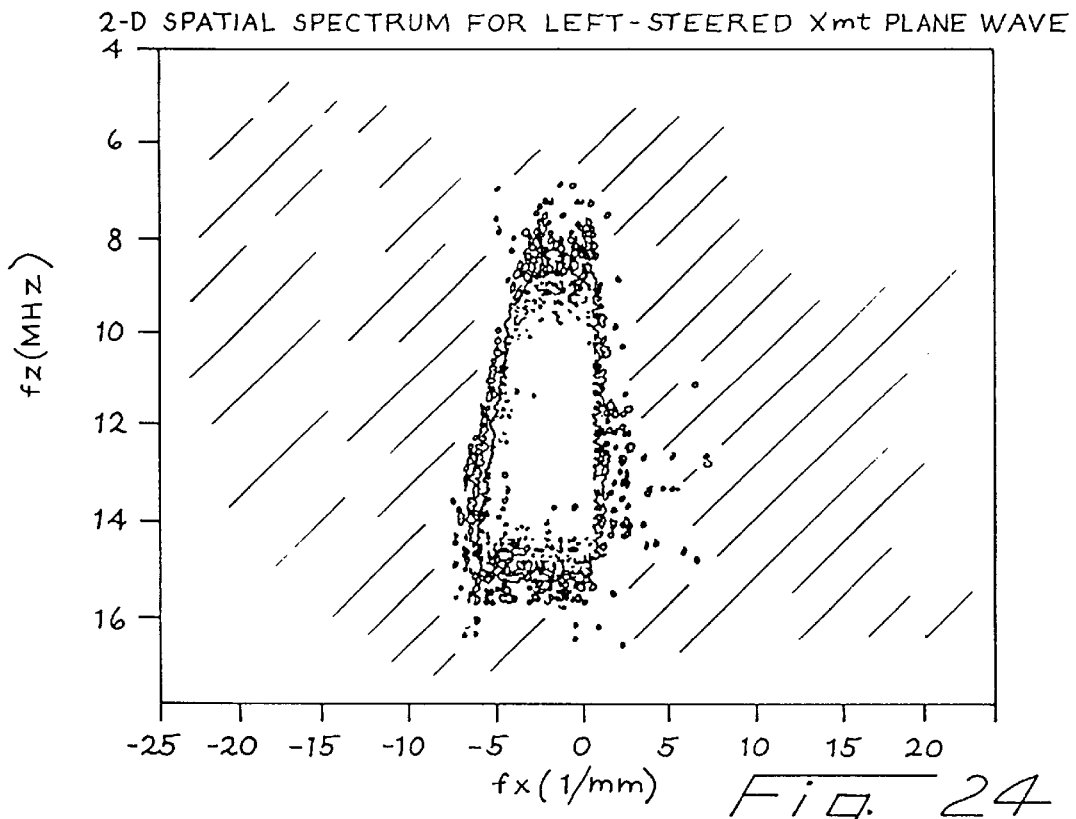
Figure 25:
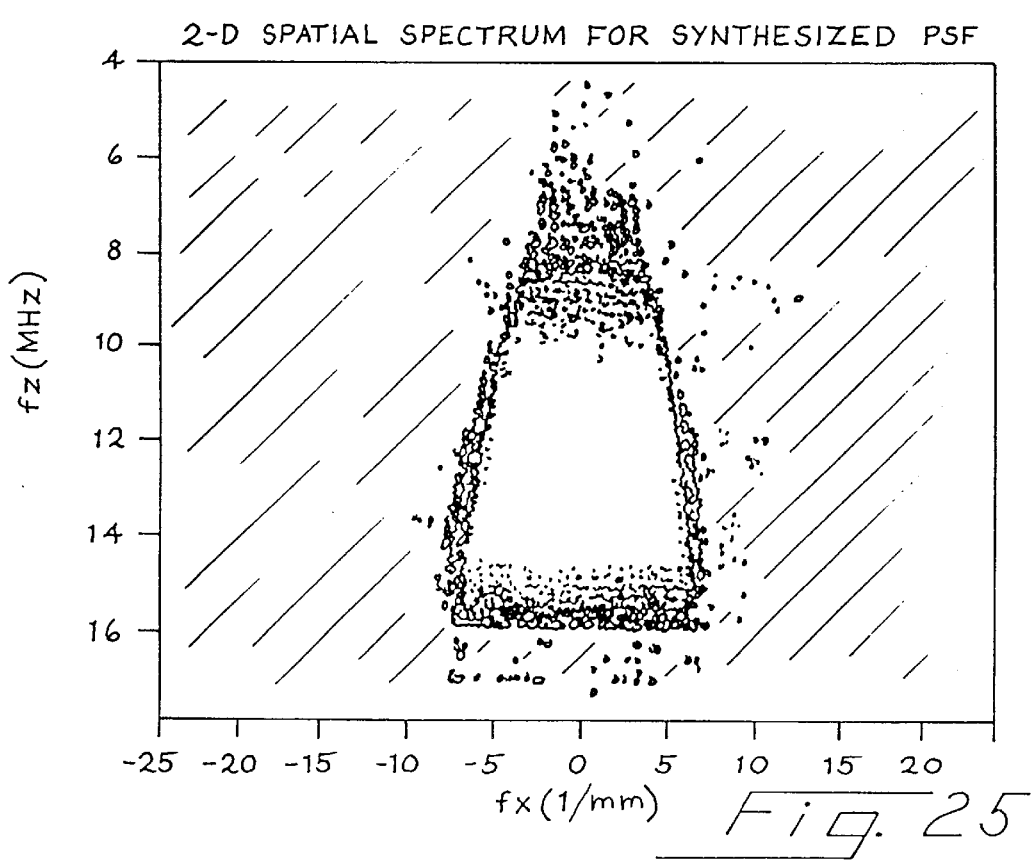

FIGS. 23, 24 and 25 show the moduli of 2-D Fourier Transform (spatial spectra) for FIGS. 20, 21 and 22, respectively.

Figure 26:
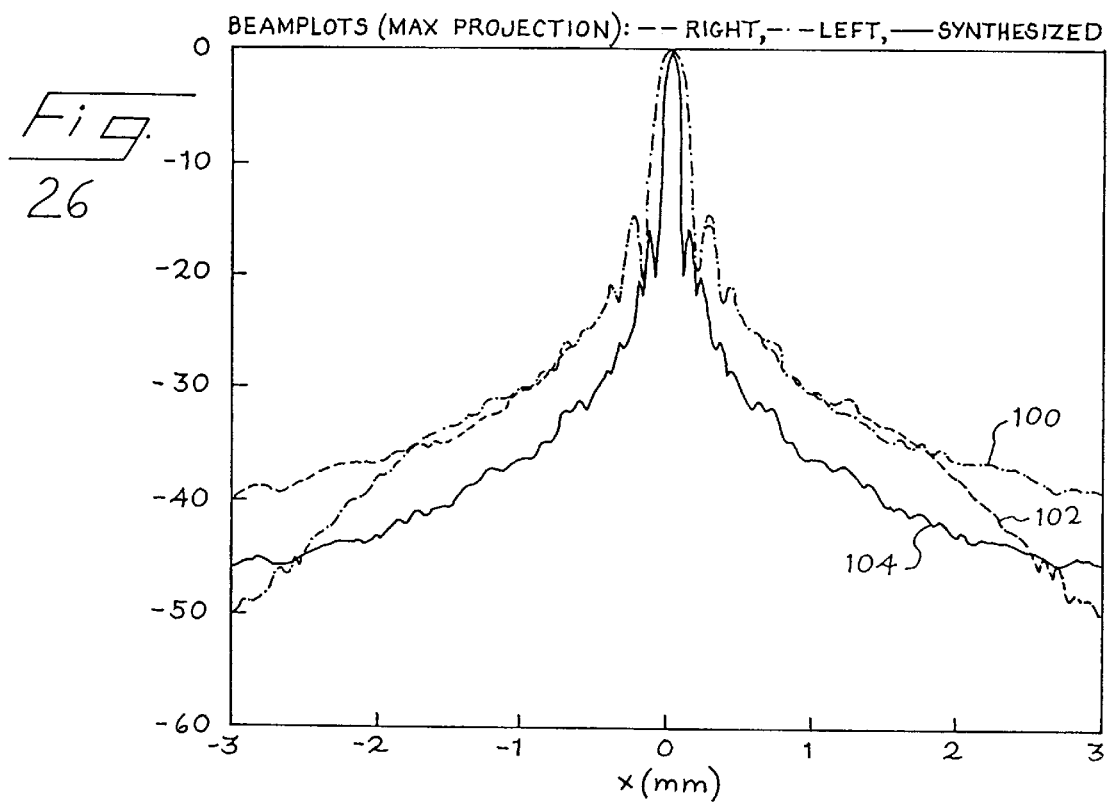

FIG. 26 shows the lateral responses, i.e., maximum projection beamplots, of the point spread function shown in FIGS. 20, 21 and 22.

Figure 27:
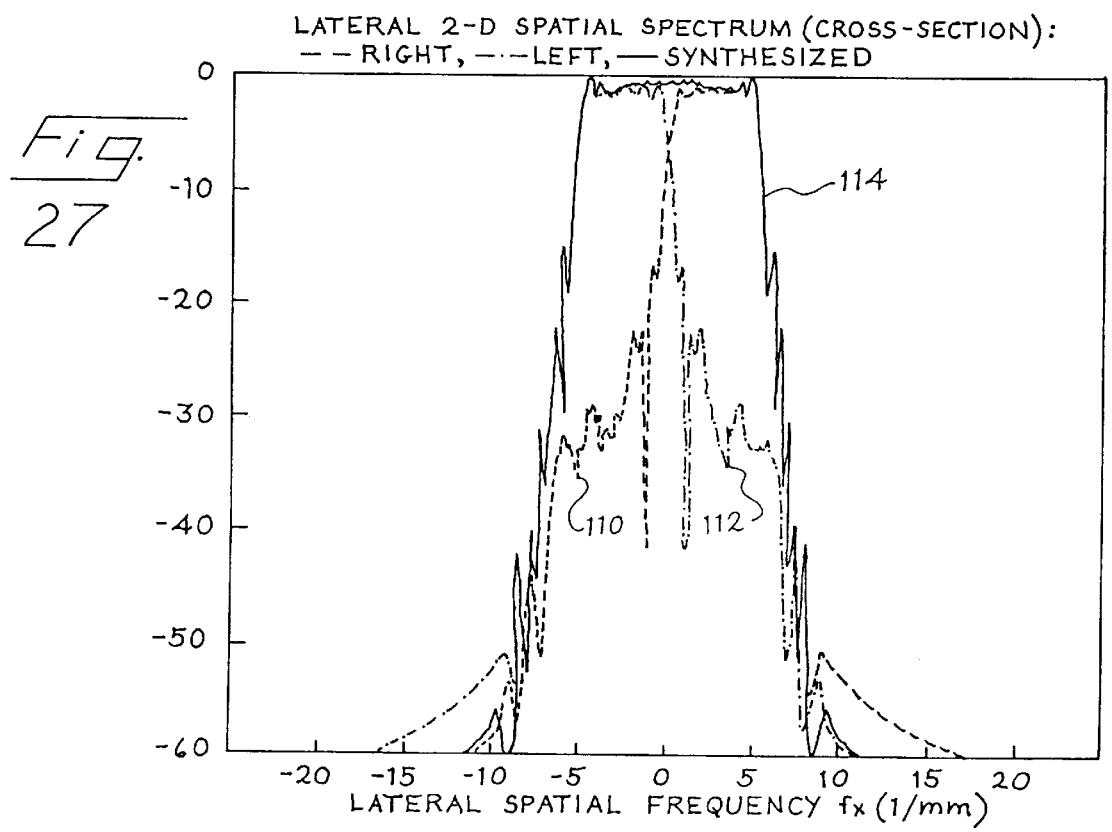

FIG. 27 shows the lateral spectra, i.e., cross sections, of the 2-D spectra shown in FIGS. 23, 24 and 25.

FIGS. 28–42 are graphs illustrating respective steps of the method of FIG. 3 for a synthesized triangle-shaped round-trip aperture function.

FIGS. 43–55 are graphs illustrating steps of synthesizing a 2-D RECT-shaped spatial spectrum.

Figure 56:
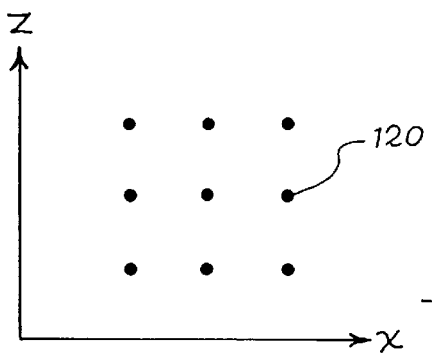
Figure 57:
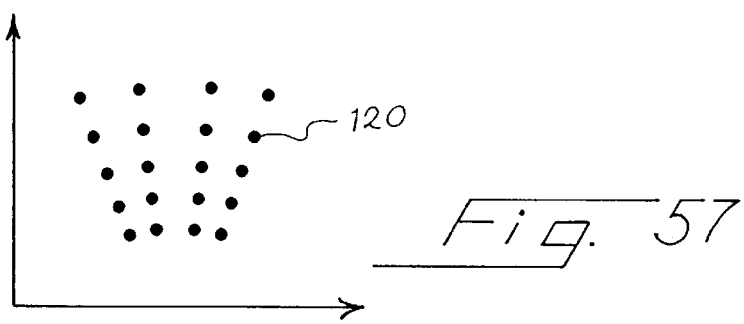

FIGS. 56 and 57 show two alternative distributions of image locations in a plane.

DETAILED DESCRIPTION OF THE PRESENTLY PREFERRED EMBODIMENTS

Turning now to the drawings, FIG. 1 shows a block diagram of a medical ultrasonic imaging system 10 that incorporates a preferred embodiment of this invention.

The system 10 includes a transmitter 12 that is coupled via a transmit/receive switch 14 to a transducer array 16. The transmitter 12 applies transmit signals to the individual transducers of the array 16, and these transmit signals are timed and phased to cause the array 16 to generate unfocused or weakly focused ultrasonic waves that insonify the region R from substantially different angles. In the following, for demonstration purposes, we will use planar arrays and a pair of plane waves steered at angles $\theta_1=+\theta$ and $\theta_2=-\theta$.

A wide variety of techniques can be used to implement the transmitter 12, including both analog and digital techniques. The following U.S. patents, all assigned to the assignee of the present invention, provide examples of the types of approaches that can be used to implement the transmitter 12: U.S. Pat. Nos. 4,550,607; 4,699,009; 5,148,810; 5,608,690; 5,675,554. These examples are, of course, not intended to be limiting in any way.

Similarly, the transducer array 16 can take any desired form. The transducer array 16 can be a 1-, 1.25-, 1.5-, 1.75-, two- or three-dimensional array. By way of example, the transducers described in any of the following of patents (all assigned to the assignee of the present invention) can readily be adapted for use with this invention: U.S. Pat. Nos. 5,261,408; 5,297,533; 5,410,208; 5,415,175; 5,438,998; 5,562,096; 5,657,295; 5,671,746; 5,706,820; 5,757,727; 5,792,058; 5,916,169; 5,920,523. Once again, this list is not intended to be limiting, and any suitable transducer array can be used.

Figure 2A:
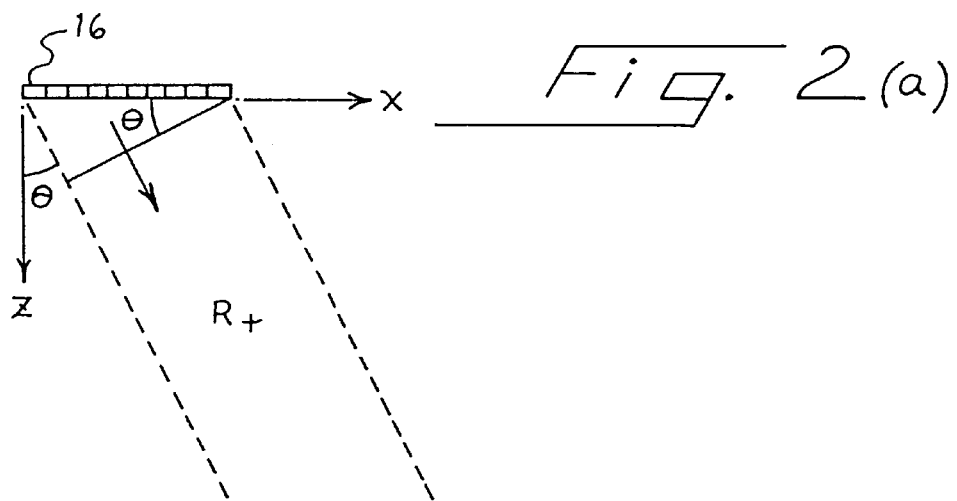
FIGS. 2a, 2b and 2c are illustrations of regions R+, R– and R, respectively.
Figure 2B:
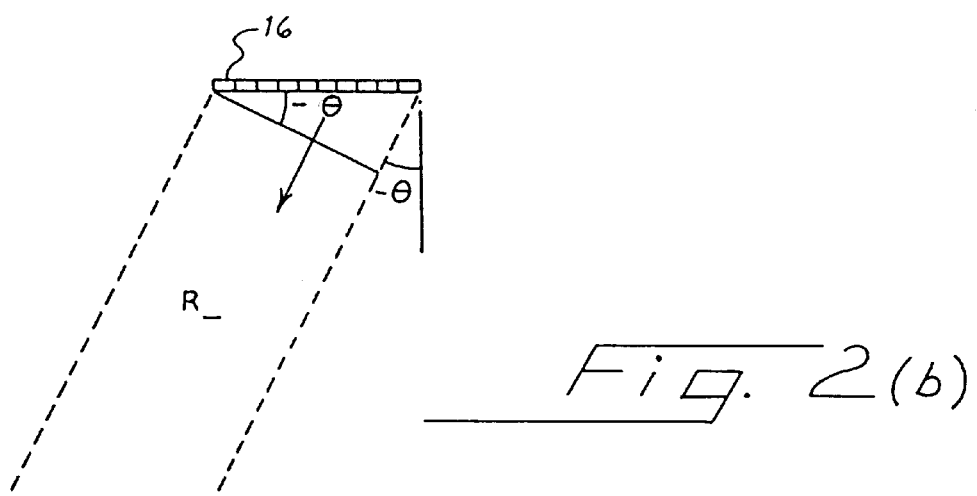

Echo signals from the insonified regions $R_+$ and $R_-$ (FIGS. 2a and 2b, respectively) are received by the transducer array 16 and are passed via the transmit/receive switch 14 to one or more A/D converters 18. The A/D converters 18 digitize the receive signals formed by the transducer elements. In this example, the array 16 includes N separate transducer elements, and the system includes N separate A/D converters 18.

The digitized receive signals are applied in parallel to one of several memories 20, 22. In this example, the memory 20 is used to store receive signals acquired in response to transmitted planar ultrasonic waves steered at a steering angle of $+\theta$, and the memory 22 is used to store receive signals acquired in response to transmitted planar ultrasonic waves steered at a steering angle of $-\theta$.

The memories 20,22 can be implemented as separate memory units, one for each transmit steering angle used, or they can alternately be implemented by a single memory unit that operates in a time-shared manner to store the receive signals associated with multiple transmit events. In alternative examples, more than two steering angles can be used, and it will often be convenient in such a case to provide more than two memories 20, 22. The memories 20, 22 can be implemented as physically separate memories, or alternately they can be implemented as selected locations in a common physical device.

The system 10 also includes a plurality of beamformers 24, 26. The beamformers 24, 26 form a multiplicity of beams from a single set of first receive signals stored in the memory 20 and a single set of second receive signals stored in the memory 22, respectively. As one example, the beamformer 24 can form beams for M separate image locations from a single set of receive signals stored in the memory 20, and the beamformer 26 can form beams for the same M image locations from a single set of receive signals stored in the memory 22. Each of the beamformers 24, 26 applies a selected apodization function and a selected time delay profile appropriate for the image location of interest, and then sums the apodized, delayed receive signals over the receive channels for each image location in the region of interest.

The beamformers 24, 26 can be implemented as separate beamformers, or they can alternately be implemented by a single device that operates in a time-shared manner to form the desired beams. The beamformers 24, 26 can be implemented using any suitable technology. For example, the beamformers described in the following U.S. patents (all assigned to the assignee of the present invention) can readily be adapted for use with this invention: U.S. Pat. Nos. 4,550,607, 4,699,009, and 5,555,534. As before, this list is not intended to be limiting.

Figure 2C:
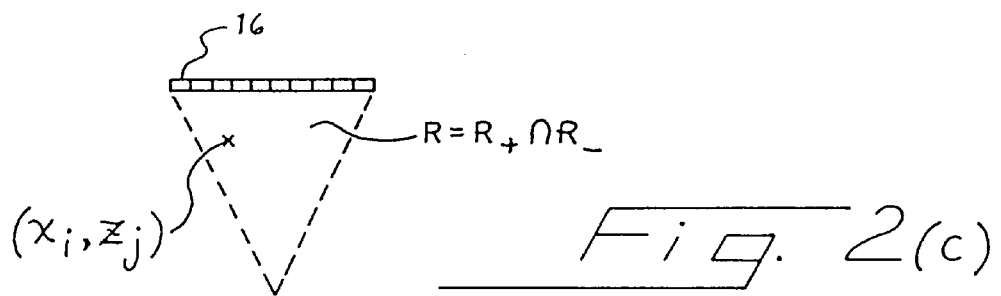

Prior to amplitude detection, the beams thus formed are applied in parallel to a synthesizer 28 that forms synthesized beams for the overlap region R (FIG. 2c). The synthesizer 28 can form these synthesized beams as a coherent or partially coherent weighted sum of the first and second beams generated by the beamformers 24, 26, respectively. The weights, in general, can be complex numbers with amplitude and phase. The synthesis function, in general, is a multi-input multi-output nonlinear function (mapping). This function can also be an adaptive one, adaptive to parameters derived from the input signals such as SNR, coherence factor, etc. This block may also include lateral and axial predetection filters.

The synthesized beams generated by the synthesizer 28 are applied to an amplitude detector 30. Additional memory blocks (not shown in FIG. 1) can be provided between the beamformers and the synthesizer and the synthesizer and the amplitude detector to store, respectively, the beamformed and synthesized images for further processing. The detected signals generated by the detector 30 are applied to an image processor 32 and then displayed on a display 34. As before, the widest variety of detectors, image processors and displays can be adapted for use with this invention.

FIG. 3 provides a flow chart of a method implemented by the system 10 of FIG. 1 using planar waves. FIGS. 4–18 demonstrate how a RECT-shaped round-trip lateral frequency response with bandwidth $2/(\lambda \text{ fnumber}_r)$(twice the one-way bandwidth) is synthesized using the flow chart of FIG. 3. To simplify the demonstration the continuous wave case will be considered first.

In block 50 of FIG. 3, the system 10 of FIG. 1 transmits a first substantially planar wave at a steering angle of $\theta_1 = +\theta$. FIGS. 4 and 5 respectively show the transmit apodization $^1a_t(x)$ and delay $^1\tau_t(x)$ profiles. The transmit apodization function is substantially constant, and utilizes all available transducer elements. The transmit delay profile increases linearly from one end of the transducer array to the other. If we temporarily ignore the effect of the finite spatial extent of the aperture, then at a spatial position $(x_i, z_j)$ and time t, a plane wave steered at angle $\theta$ can be expressed by:

$$s(t, x_i, z_j, f) = e^{j 2\pi (ft - f^x x_i - f^z z_j)} \quad \text{(Eq. 1)}$$

where, f is the temporal CW excitation frequency, $f_x$ is the lateral spatial frequency, $f_x = f \sin(\theta)/c = \sin(\theta)/\lambda$, $f_z$ is the axial spatial frequency, $f_z = f \cos(\theta)/c = \cos(\theta) \lambda$, c is the speed of sound, and $\lambda$ is the wavelength, $\lambda = c/f$. Therefore, transmit CW lateral frequency response $^1G_t(f_x)$ is a delta function at the frequency $f_x = \sin(\theta) \lambda$(FIG. 6), and it is space invariant in the region $R_+$ (FIG. 2a):

$$^1G_t(f_x) = \delta\left(f_x - \frac{\sin\theta}{\lambda}\right). \quad \text{(Eq. 2)}$$

If the finite spatial extent of the aperture is accounted for, then the transmitted field is a highly collimated beam, and is well represented by the plane-wave form described above within the beamwidth and out to the Rayleigh distance. The width of the beam is well represented by the aperture width, and the diffraction distance is the so-called Rayleigh distance $Z_0 = 0.5 \text{ k a}^2$, where a is the aperture width, k is the wavenumber, $k = 2\pi/\lambda$. For typical ultrasound imaging frequencies and aperture sizes, this distance is very large compared to typical imaging depths. For a 30 mm aperture at 5 MHz, for example, this distance is about 10 meters. Practically, then, the transmitted plane wave has the same width as the transmit aperture, and the frequency spectrum, instead of having infinitesimal width, has a finite width on the order of 1/a. As far as the concerns of the present discussion, this width is very small and the spectrum is effectively well represented by the delta function described above.

Returning to FIG. 3 (blocks 52, 58), a set of first receive signals is received in response to the transmitted plane wave of block 50 and stored in the memory 20 of FIG. 1. The beamformer 24 of FIG. 1 forms sets of first beams for selected image locations from the first receive signals. FIGS. 7 and 8 respectively show the effective receive apodization function $^1a_r(x, x_i, z_j)$ and the delay profile $^1\tau_r(x, x_i, z_j)$ for the image point $(x_i, z_j)$ in the region $R_+$. The focusing is achieved by a conventional delay profile which is a function of the image point coordinates $(x_i, z_j)$. The channel-independent delay offset for each image point $(x_i, z_j)$ is set to synchronize the arrival of the echoes from image point $(x_i, z_j)$. Note that, at the focus, the shape of the lateral frequency response is the same as the shape of the effective apodization. The effective apodization function is given by the applied apodization function and a few element dependent factors such as element sensitivity, element directivity, tissue attenuation, 1/r diffraction, etc. To achieve a RECT-shaped receive lateral frequency response, the shape of the applied apodization is set such that the shape of the effective receive apodization $^1a_r(x, x_i, z_j)$ is uniform. The width of the receive lateral frequency response $^1G_r(f_x)$ is a function of the receive f-number and wavelength (FIG. 9):

$$^1G_r(f_x) = \Pi\left(\frac{f_x}{\frac{1}{\lambda \cdot \text{fnumber}_r}}\right), \quad \text{(Eq. 3)}$$

where $\pi$ is the RECT function. Note that, assuming constant f-number and constant speed of sound in $R_+$, $^1G_r(f_x)$ is also space invariant in $R_+$.

The round-trip lateral frequency response of the first component beam $^1G(f_x)$(FIG. 10) is given by the convolution of the corresponding lateral frequency responses of transmit $^1G_t(f_x)$ and receive $^1G_r(f_x)$:

$$^1G(f_x) = {}^1G_t \otimes {}^1G_r = \Pi\left(\frac{f_x - \frac{\sin\theta}{\lambda}}{\frac{1}{\lambda \cdot \text{fnumber}_r}}\right), \quad \text{(Eq. 4)}$$

where $\otimes$ is the convolution operator. Note that, $^1G(f_x)$ is centered at the transmit lateral frequency $\sin \theta/\lambda$ and has a bandwidth that is equal to the receive (one-way) bandwidth $1/(\lambda \text{ fnumber}_r)$. It is space-invariant within the region $R_+$ because so are $^1G_t(f_x)$ and $^1G_r(f_x)$.

Returning to FIG. 3, the system 10 of FIG. 1 next transmits a second substantially planar ultrasonic wave at a steering angle of $\theta_2 = -\theta$ (block 54). As shown in FIG. 11, the transmit apodization function $^2a_t(x)$ is again a substantially constant function that includes all of the transducer elements. The associated transmit delay profile $^2\tau_t(x)$(FIG. 12) decreases linearly from one end of the transducer array to the other. As shown in FIG. 13, the lateral frequency response $^2G_t(f_x)$ is again substantially a delta function, but this time at the frequency $-\sin(\theta)/\lambda$. Note that $^2G_t(f_x)$ is space invariant in the region $R_-$.

Returning to FIG. 3 (blocks 56 and 60), the system 10 of FIG. 1 receives a set of second receive signals in response to the transmitted plane wave of block 54 and stores the second receive signals in the memory 22 of FIG. 1. As before, receive signals are digitized and stored for all transducer elements. The beamformer 26 of FIG. 1 forms sets of second beams for selected image locations from the second receive signals. The receive apodization function $^2a_r(x, x_i, z_j)$ and delay profile $^2\tau_r(x, x_i, z_j)$ applied on the second set of receive signals, and the corresponding lateral frequency response $^2G_r(f_x)$ are shown in FIGS. 14, 15 and 16, respectively, and they are the same as the ones for the first set. The delay offset is again set to synchronize the arrival of the echoes from image point $(x_i, z_j)$. The round-trip spectrum $^2G(f_x)$(FIG. 16) is centered at $-\sin(\theta)/\lambda$ and its bandwidth is also equal to the receive bandwidth $1/(\lambda \, fnumber_r)$. It is space-invariant within the region $R_-$:

$$^2G(f_x) = {^2G_t} \otimes {^2G_r} = \Pi\left(\frac{f_x + \frac{\sin\theta}{\lambda}}{\frac{1}{\lambda \cdot fnumber_r}}\right). \quad \text{(Eq. 5)}$$

Returning to FIG. 3 (block 62), the first and second beamformed receive signals are combined by the synthesizer 28 of FIG. 1. In this example, we will assume a synthesis function that consists of simple summation. The synthesized spectrum $G(f_x)$, then, is the summation of the spectra of the first and second component beams $^1G(f_x)$ and $^2G(f_x)$.

Given the spectra of the component beams (FIGS. 10 and 17), a RECT shaped spectrum can be synthesized by setting the f-number of the receive apodization for each component beam equal to:

$$fnumber_r = \frac{1}{2\sin\theta}. \quad \text{(Eq. 6)}$$

If the f-number is set less/greater than this value a null/spike is created in the middle of the round-trip spectrum. This results in undesirable spatial response with high side lobes because of the discontinuities in the spectrum. If the effective receive apodization is a tapered function instead of a RECT one, the preceding equation becomes an upper limit for the preferred f-number.

Figure 18:
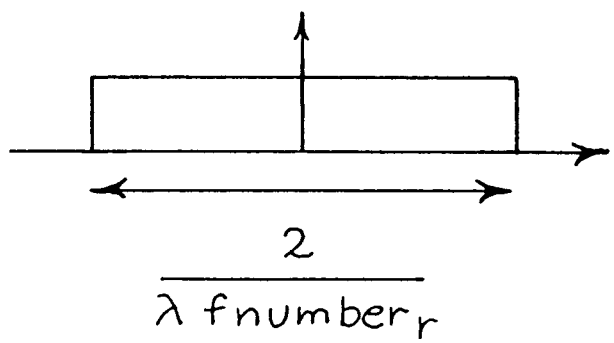

FIG. 18 shows the synthesized lateral frequency response $G(f_x)$ which is space-invariant in R, the region of overlap of $R_+$ and $R_-$. With the f-number selected based on the above equation, the shape of the synthesized spectrum is a RECT function with a bandwidth twice the component beams' bandwidth, i.e., $2/(\lambda \, fnumber_r)$:

$$G(f_x) = {^1G} + {^2G} = \Pi\left(\frac{f_x}{\frac{2}{\lambda \cdot fnumber_r}}\right). \quad \text{(Eq. 7)}$$

Since the lateral spectrum is space-invariant and has twice the one-way bandwidth, every image location in R is effectively in focus for both transmit and receive. Note that the lateral spectrum of a conventional beamformer with fixed-transmit dynamic-receive focus is space variant (dependent on the distance to transmit focus depth). Note also that, at its transmit focus depth, a conventional beamformer with RECT effective apodization shape and the same f-number on both transmit and receive would have a triangle shaped round-trip lateral spectrum with a total frequency span of $2/(\lambda \, fnumber)$, i.e., it would have a 6 dB lateral bandwidth that is only half the 6 dB bandwidth of the synthesized spectrum above.

If $\theta_2$ is not equal to $-\theta_1$, then the condition to prevent the occurrence of a null/spike in the round-trip spectrum (assuming again a RECT effective receive apodization) becomes $$fnumber_r = \frac{1}{\sin\theta_1 - \sin\theta_2}. \quad \text{(Eq. 8)}$$

For the case where the f-number for the first component beam is different than the f-number for the second component beam, the condition that needs to be satisfied for no null/spike in the spectrum (assuming again a RECT effective receive apodization for both beams) is $$\frac{{^1fnumber_r} \cdot {^2fnumber_r}}{{^1fnumber_r} + {^2fnumber_r}} = \frac{1}{2(\sin(\theta_1) - \sin(\theta_2))}. \quad \text{(Eq. 9)}$$

where, $^1fnumber_r$ and $^2fnumber_r$ are the receive f-numbers for the first and second component beams, respectively.

Note that the f-number conditions described above for a desirable synthesized spectrum are independent of the wavelength $\lambda$ (and temporal frequency f). Therefore, the CW discussion above equally applies to PW cases with arbitrary temporal frequency responses.

FIGS. 20, 21 and 22 respectively show the simulated point spread functions associated with pulsed transmit plane waves steered to the right (+θ), steered to the left (−θ) and the resulting synthesized beam generated by a summation synthesis function 28. Similarly, the two-dimensional spatial spectra for the beams generated in response to the right-steered transmit plane wave, left-steered transmit plane wave and the resulting synthesized beam are shown in FIGS. 23, 24 and 25, respectively. In FIGS. 20–25 the dynamic range is 60 dB. FIG. 26 shows the beam plot (maximum projection) for the beams generated in response to the right-steered transmitted plane wave, the left-steered transmitted plane wave, and the resulting synthesized beam at 100, 102 and 104, respectively. FIG. 27 shows the lateral two dimensional spatial spectrum (cross section) for beams generated in response to the right-steered transmitted plane wave, the left-steered transmitted plane wave, and the resulting synthesized beam at 110, 112 and 114, respectively.

Figure 42:
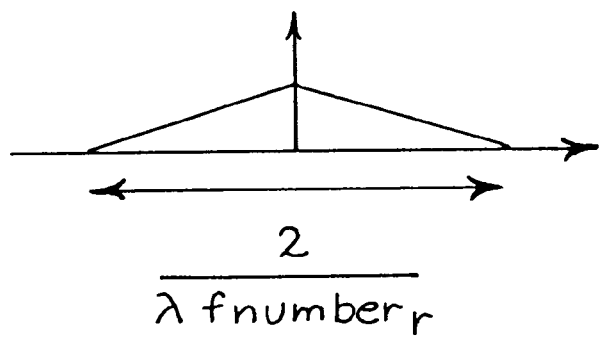

FIGS. 28–41 show another example where a triangle-shaped round-trip lateral frequency response of a total frequency span of $2/(\lambda \, fnumber)$ is synthesized using a first and second set of beams (FIG. 42). FIGS. 28–42 correspond to FIGS. 4–18, respectively, and the foregoing discussion of FIGS. 4–18 can be referenced for a fuller explanation of the parameters illustrated in FIGS. 28–42. This response, as discussed above, is equivalent to at-focus performance of a conventional beamformer with RECT-shaped transmit and receive effective apodization functions and identical transmit and receive f-numbers. Note that, since the desired round-trip aperture function in this example is also a symmetric one, the effective receive apodization function for the second firing (FIG. 40) is the mirror image of that of the first firing (FIG. 33), i.e., $^2a_r(x)={}^1a_r(-x)$. In general, however, the receive apodization functions for the component beams do not need to be mirror images of each other, such as in those cases where the desired round-trip aperture function is not symmetric. Note also that, from the stored sets of first and second receive signals, any round-trip aperture function of arbitrary shape can be generated by varying the receive apodization functions without any new firings.

The region R (FIG. 2c) over which the image locations are distributed is preferably the region over which the left and right symmetrically steered plane waves both remain substantially planar. To cover every image point in a frame, multiple pairs of plane waves with different steering angles may be used.

The techniques described here are readily applicable to two-dimensional or three-dimensional arrays for three-dimensional imaging. Since synthesizing a lateral spectrum with full round-trip bandwidth along a single lateral axis utilizes least two planar waves with substantially different frequency components along that axis, synthesizing a 2-D lateral spectrum with full bandwidth along azimuth and elevation axes utilizes more than two transmit-receive events. The following demonstrates a preferred four plane wave method to synthesize a RECT-shaped lateral frequency response with a band area of $2/(\lambda$ f-number$_{r,x})$ by $2/(\lambda$ f-number$_{r,y})$, where f-number$_{r,x}$ and f-number$_{r,y}$ are one-way receive f-numbers in azimuth and elevation, respectively.

Figure 55:
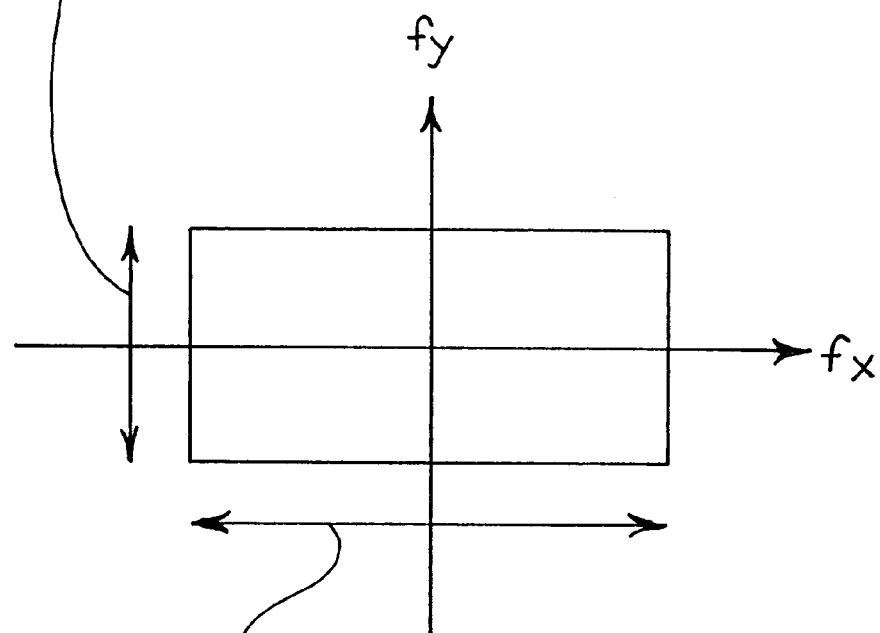

FIGS. 43–55 show the transmit, receive and round-trip spectra of the component beams and the spectrum of the resultant synthesized beam. The first transmitted plane wave is steered such that the angle between the x–z plane component of the direction of propagation and the z axis is $\theta$ and the angle between the y–z plane component of the direction of propagation and the z axis is $\psi$. The corresponding 2-D spatial spectrum is a delta function, $\delta(f_x-\sin(\theta)/\lambda, f_y-\sin(\psi)/\lambda)$ and the bird's eye view of the spectrum is shown in FIG. 43. The second, third and fourth transmitted plane waves are steered at $(\theta,-\psi)$, $(-\theta,-\psi)$ and $(-\theta,\psi)$, respectively. The corresponding spatial spectra are shown in FIGS. 44, 45 and 46, respectively. The received signals in response to each of these transmissions are digitized and stored on all acquisition channels. For an image point at $(x_i,y_j,z_l)$, where $(x_i,y_j,z_l)$ is in the volume insonified by all four plane waves, the applied 2-D receive apodization is selected such that the effective receive apodization is a RECT function. The aperture sizes in the x and y axes are selected such that fnumber$_{r,x}$=1/(2 sin($\theta$)) and fnumber$_{r,y}$=1/(2 sin($\psi$)). The receive spatial spectrum for each component beam, then, is a RECT function (FIGS. 47–50) with a 2 sin($\theta$)/$\lambda$ by 2 sin($\psi$)/$\lambda$ (or, 1/$\lambda$ fnumber$_{r,x}$) by 1/($\lambda$ fnumber$_{r,y}$)) rectangular band area. The round-trip spectra for the four component beams are given by the 2-D convolution of the respective transmit and receive spectra, and are shown in FIGS. 51–54. If the four component beams are coherently summed to form the synthesized beam, then the resultant spectrum is also a RECT function with a 4 sin($\theta$)/$\lambda$ by 4 sin($\psi$)/$\lambda$ (or, 2/($\lambda$ fnumber$_{r,x}$) by 2/($\lambda$ fnumber$_{r,y}$)) rectangular band area (FIG. 55).

Note that some of the substantial imaging benefits that are enabled by this invention are also available in a simplified implementation (referred to below as a "reduced implementation") that may be implemented in current ultrasound imaging systems without drastic architectural changes. In this reduced implementation there are two separate transmit firings used for each ultrasound line and receive signals are apodized using apodization functions that preferably vary with the steering angle of the respective plane waves as described above. The transmitters are configured to fire a pair of plane waves that are angled with respect to the line, and the receive beamformer is configured to dynamically track the transmit field as it traverses the line. The streams of line data that result from these two firings may simply be added to result in the final synthesized line data, or other methods of combination of the data, pre and/or post-detection, may be used. Note that architectures that support aperture synthesis would support such processing. This line data may then be processed in standard fashion, including splicing this line data with otherwise acquired line data. While this reduced implementation does not result in the large frame-rate benefit that is enabled by the preferred technique described above (this approach acquires a line of data with two firings where the earlier described approach acquires an image or a section of an image with two firings), it does result in the generally high lateral bandwidth and large depth-of-field that is associated with the preferred technique. Therefore, this technique can replace the technique currently used to increase the depth-of-field which uses 3 to 8 transmit/receive events per ultrasound line, each one focusing at a different depth.

This reduced implementation may also be used to produce multiple receive beams. Since the transmit beams are focused beams in the conventional beamformation techniques, the receive beams must be very nearly collinear with the transmitted beam or the round-trip locus of sensitivity becomes distorted in the vicinity of the transmit focus and imaging artifacts result. To remedy this problem, various techniques such as limiting the number of receive beams per transmit beam, reducing the receive beam spacing, widening the main lobe of the transmit beam, predetection filtering, etc., have been used. These techniques result in either under-utilization of the processing power of the multiple beamformer, or lateral resolution compromise, or both. However, since the transmitted field with the plane wave techniques described above is highly uniform in space, the round-trip locus of sensitivity is determined by the receive beam alone. Therefore, as many receive beams as multiple beamformers can form in parallel can be formed without introducing image artifacts, i.e., the processing power can be used fully. In addition each synthesized beam enjoys full lateral bandwidth and large depth-of-field. The delay data associated with each receive beam and each transmit firing are preferably arranged such that each receive beam tracks the transmit pulse as it traverses the line. As multiple receive beams are generally focused along different lines, the delay data associated with each beam will generally differ. What's more, the delay data associated with any particular line will generally differ between the two transmit firings because the angled plane wave excitation occurs at different times for spatially distinct lines.

Note that in another variant of this reduced implementation, the two plane waves may be fired simultaneously. While such an approach has the added benefit of a factor of two increase in frame-rate, it does not allow the use of the left-right inverted pairings of receive apodization functions. As outlined above for the case of the full implementation, the preferred embodiment of these reduced implementations includes the use of an effective receive aperture size that is related to the transmitted plane wave steering angles. Note also that the dynamic receive delay profiles evolve more rapidly than standard delay profiles. This is because under angled plane wave excitation, the point at which the transmitted plane waves intersect the ultrasound line migrates out in range at a velocity that is larger than the sound speed by a factor of $1/\cos(\theta)$, where $\theta$ is the angle between the ultrasound line and the normal to the plane wave front. Likewise, the f-number associated with the receive aperture is preferably related to the transmitted plane wave angle by about $1/(2\sin(\theta))$ (for the case where $|\theta_1|=|\theta_2=\theta)$.

There is also an approximate form of this single-firing method that makes use of standard receive delay profiles. Where the preferred receive delay profiles evolve to track the time at which the transmitted plane waves intersect the ultrasound line, this approximate embodiment may be implemented by modification of the transmit delay profiles only. A "depth of interest" is chosen and the transmit (plane wave) delay profiles are modified with a net delay offset such that the plane waves intersect the ultrasound line at that depth at a time that is equal to the depth divided by the sound speed. In this embodiment, standard receive delay profiles may be used. The locus of the receive focus and the intersection of the plane waves and the ultrasound line then coincide precisely at the depth-of-interest, and coincide to a degree that degrades with distance from the depth-of-interest.

Other variants make use of the fact that various signal parameters may be varied across the plane wave front by variation of those parameters on an element-by-element basis in the transmitters. Because different parts of the plane wave front intersect the ultrasound line at different depths, this parameter variation gets mapped onto depth. The signal can therefore be optimized for imaging at various depths. As an example, consider a left-steered plane wave that was launched by a series of elements, where the frequency that each element radiates is gradually lowered from the left-most to the right-most element. Then the radiated planar wavefront will have a gradual frequency shift in which the left side of the plane wave front has a higher frequency than the right side. That is, it is frequency modulated across the wave front. Because the left side of the plane wave front crosses the ultrasound line of interest at a more shallow depth than does the right side of the plane wave front, the insonification frequency along the ultrasound line is lower at large depths than it is at more shallow depths. Such a scheme may be used in conjunction with a depth dependent receive filter to enhance penetration. Envelope amplitude (transmit apodization) can also be varied across elements, for example, to compensate for the elevation diffraction effects on 1-D arrays to achieve field strength that is uniform with depth. Envelope bandwidth, in addition, may be modulated across elements (and therefore across depths) such that larger depths are insonified by larger duration pulses. Such pulses are more resistant to attenuation-induced frequency shifts than are wider band pulses and therefore additionally benefit penetration. Such pulses may also contain more overall energy (depending upon what is limiting the transmitted power). If a coded transmit pulse such as a chirp is used, the coding may be made more aggressive with depth. Such a scheme would again contribute to penetration at depth. The pulse used for shallow depths could be made a conventional (non-coded) pulse which evolves gradually into an aggressively coded pulse at depth, which would obviate problems associated with imaging at shallow depths with large duration transmit codes.

Other parameters may be varied on a firing-by-firing basis. The left-steered plane wave, for example, may be fired with a phase offset relative to the right-steered plane wave. If this phase offset is close to one half of a fundamental cycle, then the resultant fundamental frequency signal components combine destructively in each of the resultant beams but the second harmonic signal components generated during propagation add constructively. The resultant fundamental suppression is advantageous for second harmonic imaging. If the phase difference is close to a quarter of a fundamental cycle, then the second harmonic component that is generated via propagation distortion is suppressed. This has advantage in second harmonic imaging of ultrasound contrast agents (see U.S. application Ser. No. 09/191,034, assigned to the assignee of the present invention, for further information on this technique).

In all of the above implementations non-planar waves can also be used. For example, weakly diverging waves with substantially different wavefront angles can be used to cover a wider overlap region R per pair of transmit/receive events. This results in an SNR loss which may be recovered by using coded pulses with high time-bandwidth products on transmit and decoding on receive. Note that an unfocused wave does not have to be characterized by a single virtual line/point source behind the transducer, as in the case of cylindrical/spherical waves, and may instead have a distributed set of virtual line/point sources. Weakly focused waves can also be used for a higher signal to noise ratio while compromising the area of the overlap region R, i.e. compromising the field of view, and therefore, frame rate. Similarly, a weakly focused wave does not have to be characterized by a single focus point but by a distributed set of line/point foci. The transmitted fields may in fact have nearly any form, although only unfocused and weakly focused (as compared to the receive focusing) are discussed here. The transmitted waves preferably have substantially different wavefront angles and yet sufficient intensity in the image region. The appropriate receive aperture for each image location is preferably selected based on the wavefront angles of the pair of transmitted waves at that location.

The synthesized lateral bandwidth is generally at its broadest when the two firings are at the largest possible angle with respect to one another, but smaller angles are advantageous under some imaging conditions, such as when non-uniform tapered receive apodizations are used (see below). The largest possible angle is determined by the minimum practical SNR. The more highly steered the beam, the lower the transmitted signal level (owing to single-element radiation roll-off as well as other factors such as obliquity), and the worse the SNR.

At a particular imaging point, the structure of the transmitted wave may be considered to be substantially planar. This is true because the focused receive beam will generally select only the transmitted wave in the vicinity of the image point. Because the transmitted wave is unfocused (or weakly focused compared to the receive focusing), the receive beam structure dominates the transmit wave structure. The transmitted wave is substantially equivalent to a plane wave that is steered at some angle $\theta_1$ with respect to a locally defined angle. A plane wave is a very narrowband excitation in the lateral spatial sense. The effective transmit spectrum at this image point is very much like a delta function at a spatial frequency of $\sin(\theta_1)/\lambda$. For the second firing, the local angle is $\theta_2$ and the associated delta-like spectral structure is located at a spatial frequency of $\sin(\theta_2)/\lambda$. In this sense, the transmitted field is, for a particular field point of interest, effectively planar regardless of its larger-scale structure.

The receive apodizations associated with this pair of transmitted fields are preferably selected such that the resultant synthesized round-trip spatial frequency spectrum (and therefore point-spread-function) has acceptable structure.

The round-trip spatial frequency spectrum associated with the first transmission is given by the convolution of the spatial frequency spectra associated with transmit and receive. Since the spectrum of the transmit field is effectively delta-like, the round trip spectrum will be very much like a shifted copy of the receive spatial frequency spectrum (which has the same functional form as the receive apodization). The same is true of the round-trip spectrum associated with the second firing.

Consider first the case in which the receive apertures are unsteered. In that case the round-trip spectrum associated with the first transmission is, like the effective transmit spectrum, centered at the spatial frequency $\sin(\theta_1)/\lambda$, and the functional form is that of the receive aperture used in the first firing. The second is centered at $\sin(\theta_2)/\lambda$ and has the functional form of the second receive aperture. In the case when the synthesis is simply additive, the full round-trip spectrum is simply the sum of these two contributing round-trip spectra. For a reasonable resultant synthesized spectrum, the two sub-spectra preferably either (1) have sharply discontinuous edges that abut one another such that they add to a continuous spectral form, or (2), overlap and be tapered in such a way that the spectral overlap adds to result in a smooth synthesized spectrum.

If the receive aperture associated with the first firing is steered, then the resultant round-trip sub-spectrum will not be centered at a spatial frequency of $\sin(\theta_1)/\lambda$, but will be shifted relative to that frequency by an amount determined by the receive steering angle. Regardless, the final requirement is that the sub-spectra should add to result in a smooth synthesized spectrum. In other words, the transmit angle, the receive steering, and the receive apodization associated with the second firing are chosen such that the resultant sub-spectra combine to form a desirable (i.e., smooth) final spectrum.

For any pair of transmitted field angles there are a number of viable receive apertures. Some examples may be helpful. Consider the case outlined earlier in which the transmitted field is a pair of plane waves launched at equal but opposite angles and the receive aperture is uniform and unsteered. In this case the resultant sub-spectra are uniform, and with the use of receive f-numbers given by (Eqn 6), they abut one another to result in a smoothly adjoined, very broad round-trip synthesized spectrum. An alternative would be to use triangular receive apertures with twice the width of the uniform ones. In such a case the resultant sub-spectra are triangular and overlap over half their widths to result in a trapezoidal synthesized spectrum. Another alternative would be to retain the uniform receive apertures and f-numbers but steer by equal amounts. The resultant sub-spectra would then both shift, but by equal amounts such that they still abutted and formed a smooth synthesized spectrum (note that the physical apertures would have to be widened to retain the same f-number due to obliquity).

The insonification angles that come about in the case of plane wave transmit waves are particularly simple in that the wavefront angles are, over a fairly large region, independent of position. For any particular image point, however, a wide variety of different transmit waves that are non-planar result in the same pair of insonification angles at the point of interest. Single element transmit apertures at (−d tan θ) and (d tan θ), for example, where d is the depth of the image point and the positions are relative to the point on the transducer where the normal intersects the point of interest, results, for a linear transducer, in insonification angles of +/−θ. Note that in the above discussion the only consideration with regards to the transmitted wave is the wavefront angle of that wave at the imaging point in question. This angle is determined primarily by the delay profile (and to some degree by the frequency). Generally any delay profile may be used, though, as was mentioned earlier, the pair of waves that result in a large angular difference in wavefront angle is generally the best pair, up to the point of SNR concern. The pulse design is for the most part incidental to the lateral concerns, except inasmuch as the frequency affects the determination of the angle.

In some cases it may be desirable to make use of more than two transmit/receive events per 2-D image image point (or, more than four transmit/receive receive events per 3-D image point). If, for example, the ultrasound system does not have as many receive channels as the probe has elements, the minimum receive f-number and, therefore, the maximum receive spatial bandwidth achievable at deep depths are limited. In these cases, using an unsteered wave, that corresponds to a delta function at D.C. in the spatial spectrum, in addition to the left- and right-steered waves (+−θ), would allow synthesizing a contiguous bandwidth of 3 sin(θ) λ with receive f-numbers as high as 1/sin(θ). The same general guidelines presented above for the two-transmission case are preferably followed when more than two firings with different angles are used: the receive aperture associated with each firing is such that the round trip spectra either (1) have sharply discontinuous edges that abut one another to yield a continuous synthesized spectrum, or (2) have tapered edges that overlap one another in such a way that the synthesized spectrum is reasonably continuous. Again, the sets of receive aperture widths, receive apodizations, and local angles associated with the transmitted fields are the important parameters in the design. As the synthesized lateral spectrum determines the lateral beam structure, these parameters are preferably chosen to yield a spectrum that is associated with desirable lateral beam structure.

The image can be formed on an arbitrary sampling grid. In FIG. 56 the image locations 120 are located on a rectangular grid. In FIG. 57 the image locations 120 are oriented along radiating lines, in many ways similar to the location of beamformed receive signals organized on conventional receive scan lines. This type of grid may be used to compensate for spatial variations in the Nyquist sampling rate. The sampling grid may also be made equal to the display grid, thereby eliminating the need for scan conversion.

The system 10 can maximize the spatial bandwidth while achieving dynamic focusing on both transmit and receive. In other words, the system 10 can form images with effective round-trip aperture functions that are as wide as twice the maximum one-way aperture and have a RECT shape.

In addition to maximizing the spatial bandwidth, the system 10 also maximizes the temporal bandwidth because all the spatial information necessary to form a frame (or volume) of image (with maximum spatial bandwidth) can be acquired with only a few transmit/receive events. Therefore, the frame rate is no longer limited by the time required to transmit along and receive from hundreds of different angles or lines, but by the processing bandwidth of the receive beamformer. Thus, the technique described above eliminates the fundamental limit to dynamic, very-high-frame-rate, two- and three-dimensional imaging.

The effective round-trip apodization function achieved with the system 10 is not limited to the RECT shape. Alternatively, the effective round trip apodization function can be shaped to an arbitrary shape by applying appropriate apodization during receive beamformation. Since beamformation is done on the stored receive signals, multiple images with different aperture functions can be formed using the same data. These images can be processed differently and then combined to improve the information or presentation of the information.

The multiple components of the synthesized beam can be used also to detect and compensate for refraction or partial blockage of the aperture, thereby reducing shadowing.

The system 10 is compatible with conventional techniques such as sliding aperture, synthetic aperture, coded excitation, spatial compounding, frequency compounding, adjacent element shorting, and the like.

All conventional imaging modes can be used with the present invention to achieve the benefit of increased frame rates. For example, modes such as Color Doppler (velocity, power, etc.) which require multiple insonifications from each resolution cell can now operate at a much higher frame rate. Operations that are inherently low in signal to noise ratio, such as tissue harmonic imaging in the absence of contrast agent, may not provide optimum results with unfocused or weakly focused transmit waves. For these operations, the system 10 may be modified to be operated as a conventional, multiple-receive beamformer forming transmit beams along ultrasound lines.

If the object being imaged moves during the transmit/receive events, the respective component beams may be motion compensated (spatially aligned) before the synthesis, if desired.

It will be understood that the system described above includes memories that store receive signals received on all acquisition channels for a few firings. In order to achieve an extremely high frame rate, a receive beamformer with a very high processing bandwidth is desirable. However, these characteristics are not long-term problems, in view of the rapidly advancing technology for larger and cheaper memory and increased processing bandwidth.

The term "image location" is used broadly to refer to a point or to a region around a point.

The term "sum" is intended to encompass weighted sums.

The terms "substantially simultaneous" or "simultaneous" are used for transmit firings that cause received echoes to overlap in time.

The term "set" is intended to mean one or more.

The term "receive signal" is applied to signals at any stage of processing between the transducer elements and the output of the receive beamformer.

The term "beam" is intended to mean in the broadest sense the coherent sum of receive signals from at least two receive channels. Except in very few special cases, signals from different channels are first delayed and weighted relative to each other before they are coherently summed to form a beam. Thus, a beam may include only a coherent sum for a single image location, and the term "beam" is not limited to a series of coherent sums for image locations arranged along a line such as a scan line.

Of course, it will be apparent that many changes and modifications can be made to the preferred embodiments described above. As discussed above, a wide variety of techniques can be used to implement the various signal processing components of the disclosed system.

The foregoing detailed description has discussed only a few of the many forms that the present invention can take. For this reason, this detailed description is intended by way of illustration and not limitation. It is only the following claims, including all equivalents, that are intended to define the scope of this invention.

What is claimed is:

1. A medical ultrasonic imaging method comprising:
   (a) transmitting a plurality of ultrasonic waves into a region, said ultrasonic waves characterized by different wavefront angles for each of a plurality of image locations in the region;
   (b) acquiring a respective set of receive signals in response to each of the ultrasonic waves;
   (c) for a plurality of image locations, forming a plurality of component beams by delaying, apodizing, summing and filtering the sets of receive signals, each component beam formed from a respective one of the sets of receive signals, where receive apodization functions for the component beams vary as a function of at least the respective wavefront angles at the respective image locations; and
   (d) for each image location combining the corresponding component beams.

2. A medical ultrasonic imaging method comprising:
   (a) transmitting a plurality of substantially planar ultrasonic waves into a region, said ultrasonic waves characterized by different steering angles;
   (b) acquiring a respective set of receive signals in response to each of the ultrasonic waves;
   (c) for a plurality of image locations, forming a plurality of component beams by delaying, apodizing, summing and filtering the sets of receive signals, each component beam formed from a respective one of the sets of receive signals, where receive apodization functions for the component beams vary as a function of at least the plane wave steering angles at the respective image locations; and
   (d) for each image location combining the corresponding component beams.

3. A medical ultrasonic imaging method comprising:
   (a) transmitting first and second ultrasonic waves into a region, said first and second ultrasonic waves characterized by different wavefront angles for each of a plurality of image locations in the region;
   (b) acquiring sets of first and second receive signals in response to the first and second ultrasonic waves, respectively;
   (c) for a plurality of image locations, forming first and second component beams by delaying, apodizing, summing and filtering the sets of first and second receive signals, respectively, where receive apodization functions for the component beams vary as a function of at least the respective wavefront angles at the respective image locations; and
   (d) for each image location combining the corresponding component beams.

4. A medical ultrasonic imaging method comprising:
   (a) transmitting first and second substantially planar ultrasonic waves into a region, said first and second ultrasonic waves characterized by different steering angles;
   (b) acquiring sets of first and second receive signals in response to the first and second ultrasonic waves, respectively;
   (c) for a plurality of image locations, forming first and second component beams by delaying, apodizing, summing and filtering the sets of first and second receive signals, respectively, where receive apodization functions for the component beams vary as a function of at least the steering angles of the respective substantially planar waves; and (d) for each image location, combining the corresponding component beams.

5. The method of claim 1 or 2 or 3 or 4 wherein the ultrasonic waves in (a) are transmitted sequentially.

6. The method of claim 1 or 2 or 3 or 4 wherein the ultrasonic waves in (a) are characterized by different codes.

7. The method of claim 1 or 2 or 3 or 4 wherein the ultrasonic waves in (a) are characterized by substantially orthogonal codes, and wherein the ultrasonic waves are transmitted substantially simultaneously.

8. The method of claim 1 or 2 or 3 or 4 wherein (a) comprises varying at least one of the following transmit filter parameters with transmit channel: envelope modulation frequency, envelope amplitude, envelope amplitude profile, envelope phase and envelope phase profile.

9. The method of claim 1 or 2 or 3 or 4 wherein (a) comprises varying at least one of the following transmit filter parameters with transmit firing: envelope modulation frequency, envelope amplitude, envelope amplitude profile, envelope phase and envelope phase profile.

10. The method of claim 1 or 2 or 3 or 4 wherein (c) comprises varying at least one of the following receive filter parameters with component beams: demodulation frequency, envelope amplitude, envelope amplitude profile, envelope phase and envelope phase profile.

11. The method of claim 1 or 2 or 3 or 4 wherein (c) comprises varying at least one of the following receive filter parameters with image location: demodulation frequency, envelope amplitude, envelope amplitude profile, envelope phase and envelope phase profile.

12. The method of claim 1 or 3 wherein (c) comprises varying at least one of the following receive filter parameters as a function of the respective wavefront angles at the respective image locations: demodulation frequency, envelope amplitude, envelope amplitude profile, envelope phase and envelope phase profile.

13. The method of claim 2 or 4 wherein (c) comprises varying at least one of the following receive filter parameters as a function of the respective steering angles at the respective image locations: demodulation frequency, envelope amplitude, envelope amplitude profile, envelope phase and envelope phase profile.

14. The method of claim 1 or 2 or 3 or 4 wherein at least one of (a) and (b) uses a two-dimensional transducer array, and wherein the image locations of (c) are distributed in a three-dimensional space.

15. The method of claim 1 or 2 or 3 or 4 wherein the image locations of (c) are distributed in a two-dimensional plane.

16. The method of claim 1 or 2 or 3 or 4 wherein the component beams of (c) are distributed along a plurality of scan lines.

17. The method of claim 1 or 2 or 3 or 4 wherein the component beams of (c) are distributed along a single scan line.

18. The method of claim 1 or 2 or 3 or 4 wherein the combining act of (d) forms a coherent sum.

19. The method of claim 1 or 2 or 3 or 4 wherein the combining act of (d) forms a partially coherent sum.

20. The method of claim 1 or 2 or 3 or 4 further comprising: (e) forming an image from the combined beams of (d).

21. The method of claim 20 further comprising: (f) repeating acts (c)–(e) to form a second image, wherein at least one of the following receive parameters vary between the first and second images: apodization function, demodulation frequency, envelope amplitude, envelope amplitude profile, envelope phase and envelope phase profile.

22. The method of claim 1 or 2 or 3 or 4 wherein the component beam forming act of (c) is performed in a frequency domain.

23. A medical ultrasonic imaging method comprising:
(a) simultaneously transmitting a plurality of ultrasonic waves into a region, said ultrasonic waves characterized by different wavefront angles for each of a plurality of image locations in the region;
(b) acquiring a set of receive signals in response to the simultaneously transmitted ultrasonic waves;
(c) for a plurality of image locations forming a beam by focusing, apodizing, summing and filtering the set of receive signals wherein the image locations are substantially along the locus of intersection points of the ultrasonic waves as the waves propagate into the region, and where the receive apodization function varies as a function of at least the respective wavefront angles at the respective image locations.

24. The method of claim 23 where (a) comprises simultaneously transmitting two ultrasonic waves into a region, said ultrasonic waves characterized by different wavefront angles for each of the plurality of image locations.

25. The method of claim 23 where (a) comprises simultaneously transmitting a plurality of ultrasonic plane waves into a region, said ultrasonic plane waves characterized by different steering angles for the image locations.

26. The method of claim 23 where (a) comprises simultaneously transmitting two ultrasonic plane waves into a region, said ultrasonic plane waves characterized by different steering angles for the image locations.

27. The method of claim 23 wherein (a) comprises varying at least one of the following transmit filter parameters with transmit channel: envelope modulation frequency, envelope amplitude, envelope amplitude profile, envelope phase and envelope phase profile.

28. The method of claim 23 wherein (c) comprises varying at least one of the following receive filter parameters with image location: demodulation frequency, envelope amplitude, envelope amplitude profile, envelope phase and envelope phase profile.

29. The method of claim 23 wherein (c) comprises varying at least one of the following receive filter parameters as a function of the respective wavefront angles at the respective image locations: demodulation frequency, envelope amplitude, envelope amplitude profile, envelope phase and envelope phase profile.

30. A medical diagnostic ultrasonic imaging system comprising:
(a) means for transmitting a plurality of ultrasonic waves into a region, said ultrasonic waves characterized by different wavefront angles for each of a plurality of image locations in the region;
(b) means of acquiring a respective set of receive signals in response to each of the ultrasonic waves;
(c) at least one beamformer operative to form, for a plurality of image locations, a plurality of component beams by delaying, apodizing and summing the sets of receive signals, each component beam formed from a respective one of the sets of receive signals, where receive apodization functions for the component beams vary as a function of at least the respective wavefront angles at the respective image locations; and
(d) a processor operative for each image location to combine the respective plurality of component beams.

31. The invention of claim 30 wherein the transmitting means is operative to transmit the ultrasonic waves sequentially.

32. The invention of claim 30 wherein the transmitting means is operative to transmit the ultrasonic waves with different codes.

33. The invention of claim 32 wherein the transmitting means is operative to transmit the ultrasonic waves substantially simultaneously with substantially orthogonal codes.

34. The invention of claim 30 wherein at least one of the transmitting means and receiving means comprises a two-dimensional transducer array.

35. The invention of claim 34 wherein the image locations are distributed in a three-dimensional space.

36. The invention of claim 30 wherein the image locations are distributed in a two-dimensional plane.

37. The invention of claim 30 wherein the image locations are distributed along a plurality of scan lines.

38. The invention of claim 30 wherein the image locations are distributed along a scan line.

39. The invention of claim 30 wherein the beamformer operates in a time domain.

40. The invention of claim 30 wherein the beamformer operates in a frequency domain.

* * * * *

UNITED STATES PATENT AND TRADEMARK OFFICE
CERTIFICATE OF CORRECTION

PATENT NO. : 6,309,356 B1
DATED : October 30, 2001
INVENTOR(S) : Kutay F. Ustuner et al.

It is certified that error appears in the above-identified patent and that said Letters Patent is hereby corrected as shown below:

Title page,
Item [56], OTHER PUBLICATIONS, "Real-Time 3-0..." reference, delete "Snythetic" and substitute -- Synthetic -- in its place.

Column 9,
Line 21, insert -- at -- before "least".

Column 11,
Line 8, delete "$|\theta_1| = |\theta_2=\theta)$" and substitute -- $|\theta_1| = |\theta_2| =\theta)$ -- in its place.

Column 12,
Line 41, delete "non- uniform" and substitute -- non-uniform -- in its place.

Signed and Sealed this

Twenty-seventh Day of May, 2003

JAMES E. ROGAN
*Director of the United States Patent and Trademark Office*